United States Patent
Feininger et al.

(10) Patent No.: US 8,989,554 B2
(45) Date of Patent: Mar. 24, 2015

(54) METHODS AND APPARATUS TO DETECT CONTENT SKIPPING BY A CONSUMER OF A RECORDED PROGRAM

(75) Inventors: William A. Feininger, Palm Harbor, FL (US); Scott Brown, Clearwater, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 2250 days.

(21) Appl. No.: 11/766,405

(22) Filed: Jun. 21, 2007

(65) Prior Publication Data
US 2007/0248310 A1  Oct. 25, 2007

Related U.S. Application Data

(63) Continuation of application No. 10/483,825, filed as application No. PCT/US03/12001 on Apr. 17, 2003, now Pat. No. 7,248,777.

(51) Int. Cl.
*H04N 9/80* (2006.01)
*H04N 21/4147* (2011.01)
(Continued)

(52) U.S. Cl.
CPC ............ *H04N 21/4147* (2013.01); *H04N 5/76* (2013.01); *H04N 7/173* (2013.01); *H04N 21/440281* (2013.01); *H04N 21/44222* (2013.01); *H04N 21/6175* (2013.01); *H04N 21/6187* (2013.01);
(Continued)

(58) Field of Classification Search
CPC ... H04N 5/76; H04N 1/00397; H04N 1/0044; H04N 1/2112; H04N 1/212; H04N 1/2137; H04N 2101/00; H04N 5/772; H04N 1/2154; H04N 21/44222; H04N 21/6582; H04N 21/812; H04N 2007/1739; H04N 21/4147; G11B 2220/90; G11B 27/034; G11B 27/329; G11B 17/0515; G11B 19/04; G11B 2005/001; G11B 20/10527; G11B 2220/2562; G11B 2220/61; G11B 27/005; G11B 27/3027; G11B 33/144; G11B 15/005; G06K 9/00711
See application file for complete search history.

(56) References Cited

U.S. PATENT DOCUMENTS 4,697,209 A  9/1987  Kiewit et al.
4,750,213 A  6/1988  Novak
(Continued)

FOREIGN PATENT DOCUMENTS

CA  2323539  10/1999
EP  1183689  3/2002
(Continued)

OTHER PUBLICATIONS

International Preliminary Examination Report corresponding to International Application No. PCT/US2003/12001, Dec. 15, 2003.
(Continued)

*Primary Examiner* — Tat Chio
(74) *Attorney, Agent, or Firm* — Hanley, Flight & Zimmerman, LLC

(57) ABSTRACT

Methods and apparatus to detect content skipping by a consumer of a recorded program are disclosed. In a disclosed method, a plurality of recording times of sections of a recorded program are stored in association with playback times of the recorded program. Playback intervals between sequential pairs of the playback times are compared with corresponding recording intervals between sequential pairs of the recording times to determine if any portion of the recorded program was not played back in real time.

25 Claims, 18 Drawing Sheets

(51) Int. Cl.

| | |
|---|---|
| *H04N 5/76* | (2006.01) |
| *H04N 7/173* | (2011.01) |
| *H04N 21/4402* | (2011.01) |
| *H04N 21/442* | (2011.01) |
| *H04N 21/61* | (2011.01) |
| *H04N 21/658* | (2011.01) |
| *H04N 21/81* | (2011.01) |

(52) U.S. Cl.
CPC ......... *H04N 21/6582* (2013.01); *H04N 21/812* (2013.01); *H04N 2007/1739* (2013.01)
USPC ....................................................... 386/239

(56) References Cited

U.S. PATENT DOCUMENTS

| | | | |
|---|---|---|---|
| 4,752,834 | A | 6/1988 | Koombes |
| 4,782,401 | A | 11/1988 | Faeber et al. |
| 4,792,864 | A | 12/1988 | Watanabe et al. |
| 4,888,638 | A | 12/1989 | Bohn |
| 4,931,865 | A | 6/1990 | Scarampi |
| 4,943,963 | A | 7/1990 | Waechter et al. |
| 5,270,829 | A | 12/1993 | Yang |
| 5,333,091 | A | 7/1994 | Iggulden et al. |
| 5,481,294 | A | 1/1996 | Thomas et al. |
| 5,481,296 | A | 1/1996 | Cragun et al. |
| 5,512,933 | A | 4/1996 | Wheatley et al. |
| 5,521,631 | A | 5/1996 | Budow et al. |
| 5,535,209 | A | 7/1996 | Glaser et al. |
| 5,661,526 | A | 8/1997 | Hamamoto et al. |
| 5,699,370 | A | 12/1997 | Kaniwa et al. |
| 5,703,655 | A | 12/1997 | Corey et al. |
| 5,737,026 | A | 4/1998 | Lu et al. |
| 5,819,156 | A | 10/1998 | Belmont |
| 5,999,689 | A | 12/1999 | Iggulden |
| 6,002,443 | A | 12/1999 | Iggulden |
| 6,184,918 | B1 | 2/2001 | Goldschmidt Iki et al. |
| 6,233,389 | B1 | 5/2001 | Barton et al. |
| 6,343,179 | B1 | 1/2002 | Suito et al. |
| 6,404,977 | B1 | 6/2002 | Iggulden |
| 6,513,161 | B2 | 1/2003 | Wheeler et al. |
| 6,675,383 | B1 | 1/2004 | Wheeler et al. |
| 6,850,691 | B1 | 2/2005 | Stam et al. |
| 7,057,986 | B2 | 6/2006 | Fukuchi |
| 7,076,153 | B2 * | 7/2006 | Ando et al. ................... 386/211 |
| 7,248,777 | B2 | 7/2007 | Feininger et al. |
| 7,260,311 | B2 * | 8/2007 | Okujima et al. .............. 386/201 |
| 7,712,114 | B2 | 5/2010 | Ramaswamy |
| 7,882,514 | B2 | 2/2011 | Nielsen et al. |
| 8,023,798 | B2 * | 9/2011 | Hagiwara et al. ............. 386/248 |
| 8,065,697 | B2 | 11/2011 | Wright et al. |
| 2001/0014058 | A1 | 8/2001 | Ando et al. |
| 2002/0010919 | A1 | 1/2002 | Lu et al. |
| 2002/0034374 | A1 | 3/2002 | Barton |
| 2002/0056087 | A1 | 5/2002 | Berezowski et al. |
| 2002/0059577 | A1 | 5/2002 | Lu et al. |
| 2002/0090198 | A1 | 7/2002 | Rosenberg et al. |
| 2002/0120925 | A1 | 8/2002 | Logan |
| 2003/0029892 | A1 | 2/2003 | Kawano et al. |
| 2003/0154128 | A1 | 8/2003 | Liga et al. |
| 2003/0229892 | A1 | 12/2003 | Sardera |
| 2004/0250281 | A1 | 12/2004 | Feininger |
| 2005/0125820 | A1 | 6/2005 | Nelson et al. |
| 2005/0138658 | A1 | 6/2005 | Bryan |
| 2005/0177858 | A1 * | 8/2005 | Ueda ............................. 725/105 |
| 2006/0195857 | A1 | 8/2006 | Wheeler et al. |
| 2006/0212895 | A1 | 9/2006 | Johnson |
| 2006/0232575 | A1 | 10/2006 | Nielsen |
| 2007/0050832 | A1 | 3/2007 | Wright et al. |
| 2007/0192782 | A1 | 8/2007 | Ramaswamy |
| 2007/0248310 | A1 | 10/2007 | Feininger et al. |
| 2008/0148307 | A1 | 6/2008 | Nielsen et al. |
| 2010/0172407 | A1 | 7/2010 | Ramaswamy |
| 2010/0274372 | A1 | 10/2010 | Nielsen et al. |
| 2012/0011533 | A1 | 1/2012 | Wright et al. |

FOREIGN PATENT DOCUMENTS

| | | |
|---|---|---|
| EP | 1254561 | 11/2002 |
| WO | WO 0147238 | 6/2001 |
| WO | WO 2004051997 | 6/2004 |
| WO | WO 2006014495 | 2/2006 |
| WO | WO 0147279 | 6/2007 |

OTHER PUBLICATIONS

International Search Report corresponding to International Application No. PCT/US2003/12001, Jun. 27, 2003.

United States Patent and Trademark Office, "Interview Summary," issued in connection with U.S. Appl. No. 11/465,260, on Dec. 8, 2009 (3 pages).

United States Patent and Trademark Office, "Non-Final Office Action," issued in connection with U.S. Appl. No. 11/465,260, on Jul. 29, 2009 (24 pages).

United States Patent and Trademark Office, "Final Office Action," issued in connection with U.S. Appl. No. 11/465,260, on Feb. 23, 2009 (29 pages).

United States Patent and Trademark Office, "Non-Final Office Action," issued in connection with U.S. Appl. No. 11/465,260, on Sep. 18, 2008 (28 pages).

United States Patent and Trademark Office, "Notice of Allowance," issued in connection with U.S. Appl. No. 10/483,825, on Mar. 9, 2007 (10 pages).

United States Patent and Trademark Office, "Election/Restrictions Requirement," issued in connection with U.S. Appl. No. 10/483,825, on Jan. 25, 2007 (6 pages).

United States Patent and Trademark Office, "Non-Final Office Action," issued in connection with U.S. Appl. No. 11/672,706, on Jul. 23, 2009 (8 pages).

United States Patent and Trademark Office, "Non-Final Office Action," issued in connection with U.S. Appl. No. 11/576,328, on Feb. 5, 2009 (14 pages).

United States Patent and Trademark Office, "Non-Final Office Action," issued in connection with U.S. Appl. No. 11/576,328, on Aug. 7, 2009 (11 pages).

Patent Cooperation Treaty, "International Search Report," issued by the International Searching Authority in connection with PCT application No. PCT/US2005/005064, mailed Sep. 25, 2008 (2 pages).

Patent Cooperation Treaty, "Written Opinion of the International Searching Authority," issued by the International Searching Authority in connection with PCT application No. PCT/US2005/005064, mailed Sep. 25, 2008 (5 pages).

Patent Cooperation Treaty, "International Preliminary Examination Report," issued by the International Preliminary Examining Authority in connection with PCT application No. PCT/US2005/005064, issued Nov. 27, 2008 (4 pages).

IP Australia, "Second Examiner's Report," issued in connection with Australian Application No. 2005214965, mailed on Jan. 6, 2011, (4 pages).

IP Australia, "First Examiner's Report," issued in connection with Australian Application No. 2005214965, mailed on Nov. 25, 2009, (2 pages).

Canadian Intellectual Property Office, "Office Action," issued in connection with Canadian Patent Application No. 2,556,548, mailed on Jul. 18, 2011, (7 pages).

United States Patent and Trademark Office, Notice of Allowability, in connection with U.S. Appl. No. 11/465,260, issued on Oct. 27, 2011, (8 pages).

United States Patent and Trademark Office, "Final Office Action," issued in connection with U.S. Appl. No. 11/465,260, mailed on Feb. 25, 2010, (29 pages).

United States Patent and Trademark Office, "Notice of Allowance," issued in connection with U.S. Appl. No. 11/465,260, mailed on Jun. 23, 2011, (11 pages).

(56) References Cited

OTHER PUBLICATIONS

United States Patent and Trademark Office, "Non-final Office Action," issued in connection with U.S. Appl. No. 11/465,260, mailed on Sep. 30, 2010, (27 pages).

The United States Patent and Trademark Office, "Final Office Action" issued in connection with U.S. Appl. No. 13/240,805 on Jul. 18, 2013 (15 pages).

The United States Patent and Trademark Office, "Non-Final Office Action" issued in connection with U.S. Appl. No. 13/240,805 on Feb. 1, 2013 (14 pages).

The United States Patent and Trademark Office, "Notice of Allowance" issued in connection with U.S. Appl. No. 13/240,805 on Jun. 6, 2014 (7 pages).

* cited by examiner

| 60 | 62 | 64 | 66 | 68 |
|---|---|---|---|---|
| 01/23/2003 | 13:12:45.500 | 01/16/2003 | 21:57:20.920 | 13252 |

FIG. 3A

| 60 | 62 | 64 | 66 | 68 |
|---|---|---|---|---|
| 01/23/2003 | 13:12:48.200 | 01/16/2003 | 21:59:23.420 | 13252 |

FIG. 3B

| 60 | 62 | 64 | 66 | 68 |
|---|---|---|---|---|
| 01/23/2003 | 13:12:50.900 | 01/16/2003 | 21:59:26.120 | 13252 |

| NAME | START TIME | END TIME |
|---|---|---|
| INTRODUCTION | 00:00:00.000 | 00:03:30.003 |
| COMMERCIAL 1 | 00:03:30.003 | 00:06:01.015 |
| CONTENT 1 | 00:06:01.015 | 00:13:35.920 |
| COMMERCIAL 2 | 00:13:35.920 | 00:15:55.723 |
| CONTENT 2 | 00:15:55.723 | 00:20:43.513 |
| COMMERCIAL 3 | 00:20:43.513 | 00:23:53.819 |
| CONTENT 3 | 00:23:53.819 | 00:28:09.875 |
| ... | ... | ... |
| COMMERCIAL N | 00:57:20.920 | 00:59:18.562 |
| ... | | |

FIG. 6

| ADVANCED SEGMENT NAME(S) | REWOUND SEGMENT NAME(S) |
|---|---|
| 1 | 4 |
| 5 | 5 |
| 8 | 6 |
| 8 | 7 |
| 9 | 8 |
|  | 9 | ns of ordinary skill in the art will readily appreciate that the

METHODS AND APPARATUS TO DETECT CONTENT SKIPPING BY A CONSUMER OF A RECORDED PROGRAM

RELATED APPLICATIONS

This patent arises from a continuation of U.S. patent application Ser. No. 10/483,825, now U.S. Pat. No. 7,248,777, which is a national phase application filed on Jan. 13, 2004 under 35 U.S.C. §371 and which claims the benefit of international patent application serial number PCT/US03/12001, which was filed on Apr. 17, 2003.

FIELD OF THE DISCLOSURE

This disclosure relates generally to audience measurement, and, more particularly, to methods and apparatus to detect content skipping by a consumer of a recorded program.

BACKGROUND

Companies that rely on broadcast video and/or audio programs for revenue, such as advertisers, television networks and content providers, wish to know the size and demographic composition of the audience(s) that consume their program(s). Audience measurement companies address this need by measuring the demographic composition of a set of statistically selected households and the program consumption habits of the member(s) of those households. For example, audience measurement companies may collect viewing data on a selected household by monitoring the content displayed on that household's television(s) and by identifying which household member(s) are watching that content.

Traditionally, broadcast programs have been consumed at the time of broadcast. Therefore, it was safe to assume that audience members using an information presenting device such as a television or radio consumed the entire broadcast stream during the period in which the information presenting device was in use. Recently, however, recording devices such as audio cassette players, video cassette recorders (VCR's), set top boxes, digital video recorders, and personal video recorders, such as SonicBlue's ReplayTV®, TiVo® and other devices that permit content to be recorded and replayed in accordance with the desires of the audience members have become commonplace. These devices have increased the audience members' ability to time shift the consumption of broadcast programs (i.e., to record a program at the time of broadcast and consume that same program at a later time that suits the consumer). This ability to time shift has also provided the consumer with enhanced power to consume only selected portions of broadcast programs by, for example, skipping or fast-forwarding through portions of recorded content. Some consumers have used this enhanced ability to avoid viewing advertising commercials or other portions of the broadcast program.

BRIEF DESCRIPTION OF THE DRAWINGS

FIGS. 3A-3C illustrate example log entry data structures that may be created by the apparatus of FIG. 2.

FIG. 5 is an example chart identifying example segments, segment start times, and segment end times for an example program.

FIG. 6 is an example chart that may be developed by the apparatus of FIG. 2 to record fast forwarded and/or skipped segments of a recorded program and rewound/replayed segments of the recorded program.

DETAILED DESCRIPTION

Figure 1:
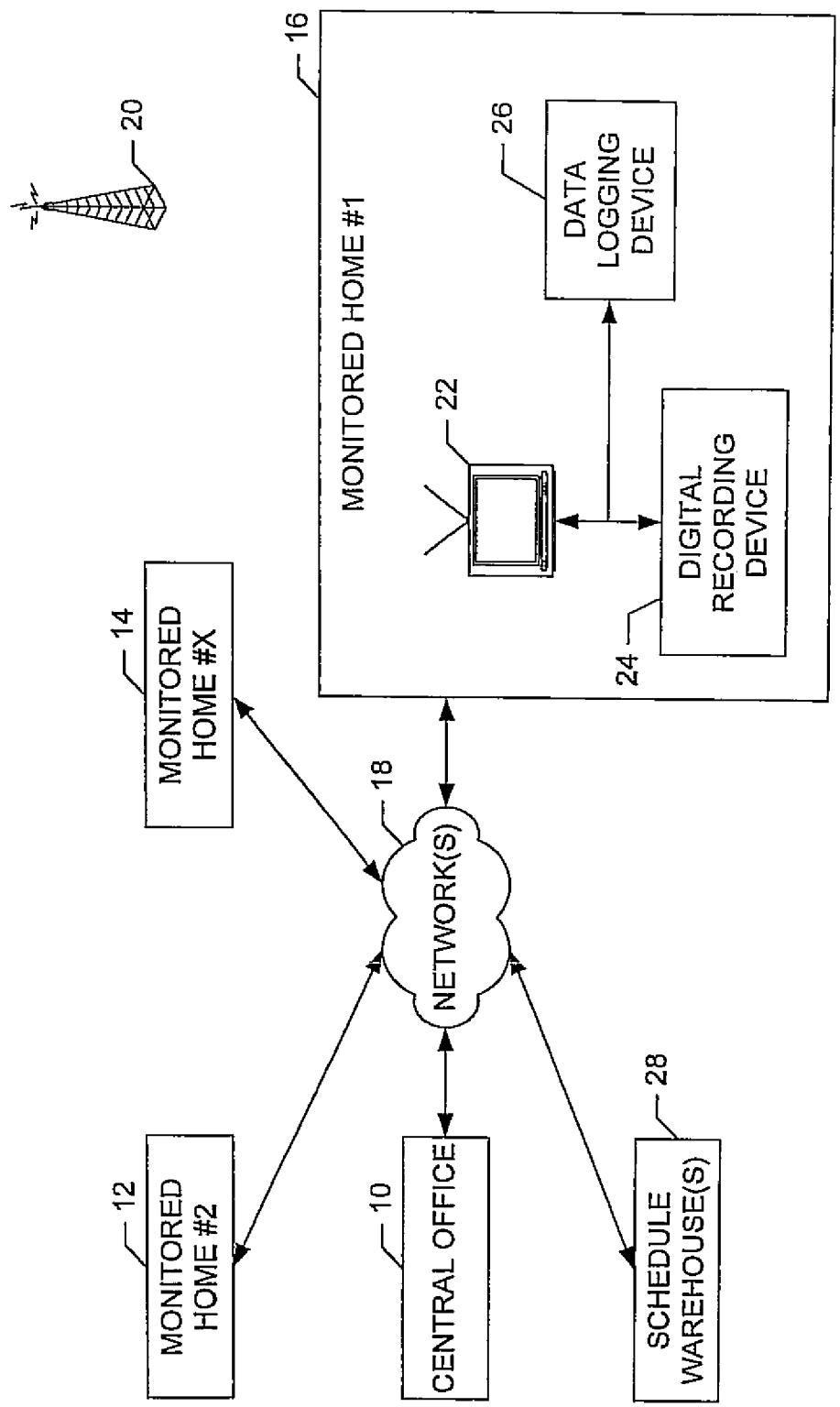
FIG. 1 is a schematic illustration of an example system to develop audience measurement statistics.

FIG. 1 is a schematic illustration of an example system to develop audience measurement statistics. In the illustrated example, a central data collection office 10 is connected to a plurality of statistically selected households 12, 14, 16 via one or more public and/or private networks 18. The monitored home sites 12, 14, 16 are provided with sensors and/or other passive and/or active data collection engines to gather data identifying the broadcast programs consumed by the members of the monitored households 12, 14, 16, and the household members that consumed those programs. The data collected in the monitored home sites 12, 14, 16 is exported periodically or continuously to the central office 10 via the network 18. The data collection office 10 includes one or more computers that analyze the data received from the monitored home sites 12, 14, 16 to develop meaningful audience measurement statistics such as, for example, television ratings, audience share measurements, etc. The network 18 can be implemented by any desired network such as, for example, the Internet, the public switched telephone network, a wireless connection, dedicated connections, etc.

In the illustrated example, the home sites 12, 14, 16 receive video and/or audio programs broadcast from one or more broadcasting systems 20. Although FIG. 1 schematically illustrates the broadcasting systems 20 by a radio tower, persons of ordinary skill in the art will readily appreciate that the broadcasting systems may be implemented by one or more of a terrestrial broadcasting system, a cable broadcasting system, a satellite broadcasting system, the Internet, or any other broadcasting system.

The broadcast programs may include primary content (e.g., entertainment, informational and/or educational content such as movies, television network programs, sporting events, news, etc.) and may also include secondary content (e.g., commercials) interspersed within the primary content. It is frequently the case that the primary content is more desirable to consumers then the secondary content, but this is not always the case (e.g., commercials (i.e., secondary content) during the NFL Superbowl are sometimes of greater interest than the football game (i.e., the primary content)). For simplicity of discussion, in the following it will be assumed that the broadcast program contains a television program (i.e., primary content) interspersed with commercials (i.e., secondary content) advertising products of a sponsor of the television program.

The home sites 12, 14, 16 may include any number of information presenting devices 22 such as a television, a computer, a radio, a stereo, an Internet appliance, etc. The home sites 12, 14, 16 may also include one or more recording devices such as an analog recording device (e.g., a magnetic tape recording device for recording audio programs and/or a video cassette recorder (VCR)), and/or a digital recording device 24 such as a set top box, a digital video recorder, a personal video recorder, a computer, etc. The home site 12, 14, 16 may also be provided with a data logging device 26 which is coupled to the digital recording device to collect, record and/or analyze data reflecting usage of the digital recording device 24. The data collected and/or analyzed by the data logging device 26 may be periodically exported to the central office 10 via the network 18 for further analysis and/or distribution. The data exportation may be performed at regularly scheduled time intervals and/or may be triggered by predetermined events.

If a digital or personal video recorder 24 is present in the home site 12, 14, 16, the home site 12, 14, 16 may be connected to one or more schedule warehouses 28 via one or more public and/or private networks 18. In the illustrated example, the schedule warehouse 28 stores media schedules of broadcast programming for use by digital and/or personal video recorders 24. The media schedules stored in the schedule warehouse 28 may be compiled from information provided by a number of sources. For example, they may be developed from information provided by broadcasters and/or content providers. The media schedules may include, among other things, the titles of programs to be broadcast, the scheduled broadcast times for the programs, the broadcast channels that are to carry the scheduled programs at the scheduled times, and the identities of the networks that intend to broadcast the programs. Some of the information present in the media schedules may not be provided to the digital/personal video recorders 24, but may instead be supplied to audience measurement companies (e.g., the central office 10) to assist in computing ratings and/or audience demographics information. Thus, as shown in FIG. 1, the central office 10 may also be coupled to the schedule warehouse 28 via the network 18.

On a periodic basis, the digital/personal video recorders 24 retrieve media schedule(s), or portion(s) thereof, from the schedule warehouse 28 via the network 18. The retrieved schedules are stored in a local memory of the digital and/or personal video recorder 24 for use in selecting and recording programs of interest. In the personal video recorder context, the media schedules may include data that enables the personal video recorder 24 to select and store programs that may be of interest to the members of the household 12, 14, 16 based on prior viewing habits and/or otherwise identified interests of those members.

Figure 2:
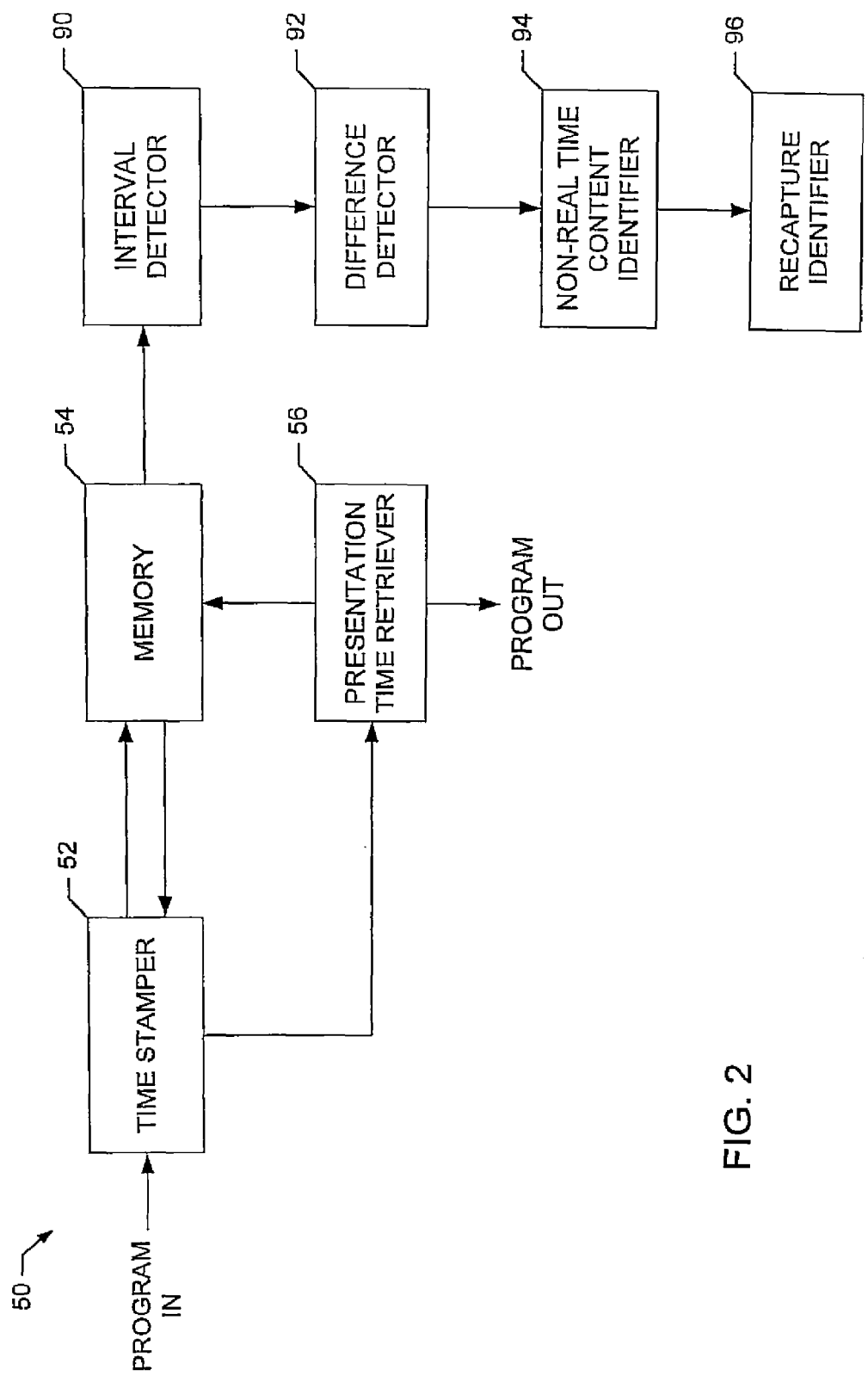
FIG. 2 is a schematic illustration of an example apparatus to detect content skipping by a consumer of a recorded program.

FIG. 2 is a schematic illustration of an example apparatus 50 to detect portions of a recorded program that were not played back in real time (e.g., that were skipped, fast forwarded, paused, and/or rewound). As explained in further detail below, the example apparatus 50 of FIG. 2 may be implemented by one or more of the digital recording device 24, the data logging device 26, and/or the central office 10. The apparatus 50 is equipped to record and analyze data reflecting usage of, for example, a digital recording device 24 in a home site 12, 14, 16.

For the purpose of logging recording or presentation times of a broadcast program recorded at a home site 12, 14, 16, the apparatus 50 is provided with a time stamper 52. The time stamper 52 records a plurality of sequential times in association with the recorded program. In particular, the time stamper 52 records the times at which various sections of a received broadcast program are received and/or stored in a memory 54 of, for example, a digital recording device 24. For example, if the digital recording device 24 is implemented by a digital/personal video recorder such as the TiVo® video recorder, the recorded program may be processed in accordance with a modified version of the MPEG-2 standard. In such an example, the broadcast program received by the digital video recorder may be compressed and stored as two datastreams, namely, an audio datastream and a video datastream. Each of the datastreams contains a series of data packets. Each of the packets includes a header and a payload. The header contains a number of fields to store information about the associated content of the packet and/or the relationship of the packet to other packets in the datastream (e.g., a packet sequence number). The payload section of the packet stores the program content (e.g., a section of the audio and/or video content of the broadcast program). The time stamper 52 writes the time at which the corresponding payload was recorded by the digital/personal video recorder 24 in a field of the header of the packet. In the example of the TiVo® digital/personal video recorder, the time stamps provided by the time stamper 52 are presentation times (e.g., the times at which the corresponding packets were received and/or stored by the TiVo® product) and are intended for use in synchronizing the packets of the audio datastream and the packets of the video datastream during playback of the recorded program.

For the purpose of recording the playback rate of the recorded program, the apparatus 50 is further provided with a presentation time retriever 56. When the recorded program is played back from the memory 54 (which may be within seconds or minutes of receipt of the broadcast program by the digital recording device 24 if the consumer is "live" viewing the same, or may be hours, days, weeks, months or longer after receipt of the broadcast program by the digital recording device 24), the presentation time retriever 56 retrieves the recording/presentation times of some or all of the sections of the program being played back and stores those recording times in association with the playback time of the corresponding sections of the program. In other words, as the program is played back, the presentation time retriever 56 periodically creates a running list of log entry data structures 58 such as those shown in FIGS. 3A-3C. The log entry data structures 58 are preferably created and populated at evenly spaced intervals of real time. In particular, each log entry data structure 58 is preferably created at substantially the time that a corresponding section of the recorded program is being played.

Each log entry 58 may include a playback date field 60 to store data representative of the playback date (in this example, formatted as MM/DD/YYYY for month/day/year) of a corresponding section of the recorded program, a playback time field 62 to store data representative of the playback time (in this example, formatted as HH:MM:SS.mmm for hour/minute/second/millisecond) of the corresponding section of the program being played, a recording date field 64 to store data representative of the recording date (in this example, formatted as MM/DD/YYYY) of the section of the recorded program being played, and a recording time field 66 to store data representative of the recording time (in this example, formatted as HH:MM:SS.mmm) of that same section of the program. In the example of the TiVo® video recorder, the presentation time retriever retrieves the presentation date/time from the header(s) of the packet(s) currently being played. The presentation time retriever 56 then respectively stores the retrieved presentation date/time in the recording date field 64 and recording time field 66 of a log entry data structure 58 to associate that data with the playback time of the corresponding packet(s). Additionally, the presentation time retriever 56 may store a current date and time in the playback date field 60 and the playback time field 62 of that same log entry data structure 58.

The presentation time retriever 56 may also retrieve a program identifier from the packet header of the section of the recorded program currently being played back and store that identifier in one or more program identification fields 68. The program identifier may be any form of information that identifies the program being played back (e.g., a program name, a program identification number, etc.), and/or the station that broadcast the program (e.g., a broadcast channel number, a station name, or a standardized station identifier). In the example of FIGS. 3A-3C, the program identification field 68 contains a universal program identifier. As is know to persons or ordinary skill in the art, a universal program identifier is a program code that identifies a program based on a pre-defined, standardized code arrangement.

In the example of FIG. 2, the playback dates and times stored by the presentation time retriever 56 are provided by the time stamper 52. However, persons of ordinary skill in the art will appreciate that the playback dates and times may alternatively be developed by the presentation time retriever 56 and/or by a clock separate from the time stamper 52. Irrespective of their source, the playback times stored by the presentation time retriever 56 preferably correspond to real time and are evenly spaced. The playback spacing or intervals between the playback times/log entry data structures 58 are a matter of design choice. However, persons of ordinary skill in the art will appreciate that shorter intervals between the recorded playback times/log entry data structures 58 (i.e., the more playback times recorded, the fewer packets that are played without logging their recording times), translate into more accurate identification of portions of the recorded program that were not played back in real time, and that shorter playback intervals also translate into higher data collection volume and, thus, more severe memory resource demands. In the illustrated example, the playback intervals are 2.7 seconds long (i.e., a log entry data structure 58 is created every 2.7 seconds). Although the evenly spaced, equal playback intervals are currently preferred, persons of ordinary skill in the art will appreciate that, instead of being triggered by time, the creation of a log entry data structure 58 may be triggered by one or more predetermined events such that the playback intervals are not equal and/or not evenly spaced in time.

Persons of ordinary skill in the art will appreciate that, in examples in which the same playback interval is consistently used between log entries, it is possible to not record the playback time in the running log because the log entry data structures 58 themselves inherently provide both an indication of the time lapse between entries (i.e., it is always a consistent value such as, for example, 2.7 seconds) and the aggregate amount of time that has passed during playback. In other words, because we know that a log entry data structure 58 recording the playback time of the section of the program currently being played back is made every, for example, 2.7 seconds, then we know that the twenty-first log entry (e.g., the log entry data structure 58 of FIG. 3B) occurred 2.7 seconds after the twentieth log entry (e.g., the log entry data structure 58 of FIG. 3A) without having to compute a playback interval between those data structures. However, even in cases where the same playback interval is consistently used, it may be desirable to record the playback times as a mechanism for sorting and/or distinguishing between log entries.

Figure 4:
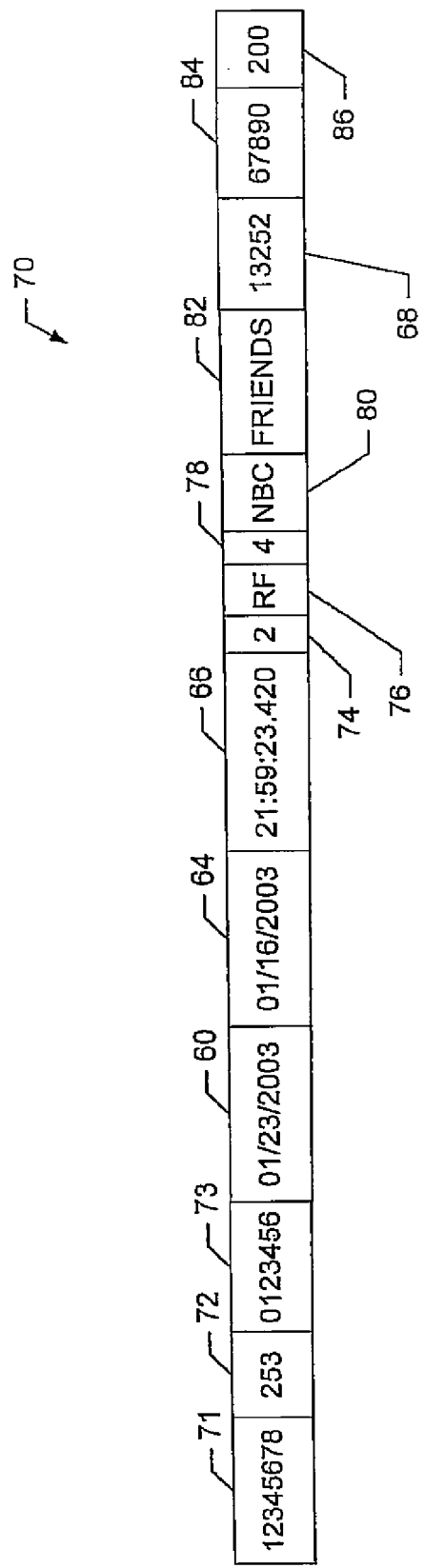
FIG. 4 illustrates another example log entry data structure that may be created by the apparatus of FIG. 2.

An alternative example data structure 70 is shown in FIG. 4. Like the example data structure 58 of FIGS. 3A-3C, the example data structure 70 of FIG. 4 includes a playback date field 60, a recording date field 64, a recording time field 66, and a program identification field 68. However, unlike the data structure 58 of FIGS. 3A-3C, the data structure 70 of FIG. 4 does not contain the playback time field 62 for the reasons explained above. The playback date field 60 is retained because it might be interesting to learn how much time passed between broadcast and playback of the recorded program. Similarly, although not used in the example of FIG. 4, the playback time field 62 is preferably retained in the data structure 70 because it might be interesting to learn the time of day at which the playback occurred.

As shown in FIG. 4, the example log entry data structure 70 includes many fields not present in the example data structure 58 of FIGS. 3A-3B. For instance, the data structure 70 of FIG. 4 includes the following fields: (a) a digital recording device serial number field 71, (b) a sequence number field 72, (c) a tuner identification number field 73, (d) a playback mode indicator field 74, (e) an input source indicator field 76, (f) a channel number field 78, (g) a network name field 80, (h) a program name field 82, (i) a universal network identifier field 84 and j) a checksum 86.

The digital recording device serial number field 71 may contain the serial number of the digital recording device 24 being monitored. The serial number may be a variable-length string (e.g., 12345678) that uniquely identifies a particular digital recording device 24 such as a set top box, a digital video recorder, and/or a personal video recorder. In monitored households 12, 14, 16 having multiple digital recording devices 24, the serial number of the digital recording devices 24 can be used to track the viewing habits within a household 12, 14, 16 on a digital recording device 24 by digital recording device 24 basis.

The sequence number field 72 may be used to number the data structures 58, 70 to ensure that they are transmitted, analyzed, and/or processed in the correct order. The sequence number field may, for example, store an unsigned integer. For example, the integer may be a value in the range of 0-255. When the sequence number reaches 255, the sequence number value is returned to zero to again begin numbering the next consecutive sequence of data structures 58, 70 from 0-255.

The tuner number field 73 may contain a variable length string identifying the tuner that received the recorded program. For example, the tuner number field 73 may be used to indicate which tuner in a digital recording device 24 having multiple tuners was used to receive the recorded program.

The playback mode indicator field 74 may contain playback mode indicator data designating the operational mode of the digital recording device 24 at the time the log file data structure 70 was generated. In the illustrated example, the playback mode indicator data may be a coded such that the code "1" indicates the device 24 is playing a live broadcast, the code "2" indicates the device 24 is playing a recorded program, the code "3" indicates the device 24 is playing an alternative stream (e.g., a movie trailer which originates from the hard disk of the device 24 after being, for example, downloaded via the Internet or a television broadcast channel), the code "4" indicates the device 24 is recording a user selected program, the code "5" indicates the device is recording a program based on a user profile, the code "6" indicates the user is accessing a full screen user interface or menu (without audio), and the code "7" indicates that the user is accessing a transparent user interface screen that overlays a playing program (with audio). If the playback mode data is code "6", the broadcast time field 66, the input source field 76, the channel number field 78, the station name field 80, and the program name field 82 may be blank in this circumstance and the log data may not identify the user's activity.

The input source indicator field 76 may contain a code that represents the input source through which the stored broadcast 120 was received by the digital recording device 24. The input source indicator field 76 may designate codes for different input sources to the digital recording device 24. For example, the code "RF" may represent a radio frequency input, the code "SAT1" may represent a first satellite input, the code "SAT2" may represent a second satellite input, the code "COMP" may indicate a composite input, the code "SVID" may represent an S-video input and the code "other" may indicate that the recorded program did not come from a broadcast source, such as when the video was pre-loaded onto a hard disk or the video was delivered through a private channel or broadband connection. In such circumstances, the video being viewed will not be identified, and the playback time and channel number fields 62, 78 will be left blank.

The channel number field 78 may contain data indicative of the channel number of the internal tuner of the digital recording device 24 (e.g., a numerical value of 0-99999), data indicative of a channel number of an external device such as a television (e.g., a numerical value of 0-99999) coupled to the digital recording device 24, data indicative of a minor channel, the code "manual," and/or nothing. In the illustrated example, a numeric value stored in the channel number field 78 indicates a tuned channel number. However, the stored channel number in the channel number field 78 may not be the same as the channel number that is displayed in the user interface of the digital recording device 24 because the user interface may display logical channel numbers that have been remapped into a single logical channel space.

In the illustrated example, the channel number field 78 contains data indicative of the tuned channel of the external device, not the tuned channel of the digital recording device 24, if an external device is connected to the RF or satellite input (e.g., on channel 2, 3 or 4). In such circumstances, the input source field 76 indicates that the input source is "RF." Therefore, interpretation of the data in the channel number field 78 is dependent on knowledge of the identity of the device connected to the RF input of the digital recording device 24.

In the illustrated example, the channel number field 78 contains the code "manual" when the user has requested a manual record from a particular input source and has specified that the digital recording device 24 should not change channels on the device before starting the recording process. The "manual" channel code may be used with devices that cannot be tuned (e.g., camcorders and other devices). The "manual" channel number may also be used with pay-per-view (PPV) events or other types of programs where the user is required to perform some special action to tune to the desired channel.

In the illustrated example, the network name field 80 contains a variable-length string of data indicative of the call letters or other associated name (e.g. "NBC") of the broadcasting station that broadcast the recorded program. Thus, the data in the network name field 80 corresponds to the data contained in the channel number field 78. The station name may be determined, for example, by comparing the tuned channel number from the tuned channel field 78 with a program schedule that has been downloaded from the schedule warehouse 28. If the station name cannot be determined, then the network name field 80 may be left blank.

In the illustrated example, the program name field 82 contains a variable-length string of data representative of the name of the recorded program (e.g. "Friends"). The program name may be determined, for example, by comparing the tuned channel number contained in the channel number field 78 with a program schedule that has been downloaded from the schedule warehouse 28. If the program name cannot be determined, then the program name field 82 may be left blank.

In the illustrated example, the network identifier field 84 contains data representative of the network that broadcast the recorded program. For example, the data contained in the network identifier field 84 may be a universal network identifier that is based on a standardized arrangement such as the universal broadcast/cable station identifier arrangement. The universal broadcast/cable station identifier arrangement identifies each broadcast/cable station by a unique code. Alternatively, a multi-system operation (MSO) specific code may be used.

In the illustrated example, the checksum field 84 contains data representative of a computed checksum. The computed checksum may be, for example, a numerical value based on the number of bits set in the corresponding data structure 58, 70. Any known software technique for generating checksums may be used to calculate and/or check the checksum value.

In order to determine if the audience has played a portion of the recorded program back in something other than real time, the apparatus 50 is further provided with an interval detector 90 and a difference detector 92. The interval detector 90 computes recording intervals between the recording times appearing in successive ones of the log entry data structures 58, 70 developed by the presentation time retriever 56. The interval detector 90 computes the recording interval by finding the difference between the recording times appearing in successive log entries 58, 70. Persons of ordinary skill in the art will appreciate that, if the recording times appearing in successive log entries 58, 70 are identical, then the recorded program has been paused for the duration of the corresponding playback interval (i.e., for the entire duration of the time between the log entries 58, 70 corresponding to the identical recording times). If, on the other hand, the difference between the recording times appearing in successive log entries 58, 70 has a first sign (e.g., positive), then either the recorded program was played back in real time or the recorded program was played back at a rate different than real time (e.g., a portion of the program was skipped or fast forwarded, or a portion of the program was played back in slow motion or was paused for less than the entire duration of the playback interval). If instead the difference between the recording times appearing in successive log entries 58, 70 has a second sign (e.g., negative), then the recorded program was rewound.

The interval detector 90 may also compute playback intervals. In particular, the interval detector 90 may optionally calculate the difference between the playback times stored in successive log entries 58, 70 to determine a playback interval corresponding to each pair of successive log entry data structures 58, 70. However, as explained above, if log entries 58, 70 are generated at regular intervals, calculating playback intervals for each pair of successive log data structures 58, 70 may be dispensed with since the playback intervals will always be the same. In such circumstances, the same, known constant value (e.g., 2.7 seconds) may be used for the playback intervals.

To determine if any portion(s) of the recorded program have been played at a rate different then real time, the apparatus 50 is provided with a difference detector 92. The difference detector 92 determines if a difference exists between any of the recording intervals calculated by the interval detector 90 and the corresponding playback interval. In particular, the difference detector 92 preferably subtracts a value representative of the recording interval calculated by the interval detector 90 from a value representative of the corresponding playback interval. (As mentioned above, the corresponding playback interval may be a value calculated for each pair of data structures 58, 70, or it may be a constant value based on the understanding that the log entries 58, 70 are developed at a constant periodic rate.) If the difference calculated by the difference detector 92 is zero, then the portion of the recorded program corresponding to the recording times stored in the data structures 58, 70 was played back in real time. If, on the other hand, the difference calculated by the difference detector 92 is non-zero, then the portion of the recorded program corresponding to the recording times stored in the data structures 58, 70 was not played back in real time. In particular, if the playback interval is smaller than the recording interval such that the difference calculated by the difference detector 92 is negative, then the portion of the recorded program corresponding to the recording times stored in the data structures 58, 70 was advanced faster than real time (e.g., the portion was at least partially skipped and/or fast forwarded). Otherwise, if the playback interval is larger than the recording interval (or the recording interval has a negative sign due to a rewind event) such that the difference calculated by the difference detector 92 is positive, then the portion of the recorded program corresponding to the recording times stored in the data structures 58, 70 was at least partially played in slow motion, rewound, and/or paused for less than the full time interval between the corresponding data structures 58, 70.

To identify the segment(s) in the portion of the recorded program that were not played back in real time, the apparatus 50 is further provided with a non-real time content identifier 94. The non-real time content identifier 94 responds to detection of non-zero differences by the difference detector 92 by searching a database to determine the identities of the program segments that were skipped, fast forwarded, and/or rewound. For example, the database may include a plurality of program tables identifying the start times, end times, and names of the segments of broadcast programs. Each of the program tables may be associated with a respective broadcast program, and the start and end times appearing in those program tables may be normalized as explained below (e.g., such that the start of broadcast time is time zero).

The program tables may be created by the schedule warehouse 28, the central office 10, content providers, and/or broadcast stations. An example program table that may be used by the non-real time content identifier 94 to identify the segment(s) of an example recorded program that were not played in real time is shown in FIG. 5.

In the example of FIG. 5, the program table includes a name column, a start time column, and an end time column. The name column is populated with unique names of the segments of the corresponding program. For instance, in the example of FIG. 5, the program includes the following segments: (a) introduction, (b) commercial 1, (c) content 1, (d) commercial 2, (e) content 2, (f) commercial 3, (g) content 3, etc. The start time and end time columns are populated with the start and end times of the corresponding program segments. Preferably the start times and end times stored in the program table are normalized to the start of a broadcast interval rather than reflective of actual broadcast times. For example, the program of FIG. 5 is to run the introduction segment from time zero (i.e., the start of the broadcast interval) until time 00:03:30.003 (i.e., for a length of three minutes, thirty seconds, and 3 milliseconds). By way of another example, the segment entitled "commercial 1" is to start three minutes, thirty seconds, and 3 milliseconds after the broadcast interval begins.

Normalized times are preferably used in the program tables instead of actual broadcast times because, due to reflections during transmission, geographic distances, etc., different home sites 12, 14, 16 may receive the same broadcast program at slightly different times. However, all of the relative lengths of the broadcast segments as received at the home sites 12, 14, 16 will be the same from site to site regardless of transmission delays. Therefore, by normalizing the start and end times of the program tables to the start times of the programs they represent, and by normalizing the start times and the end times recorded in the log entry data structures 58, 70 to the overall start (i.e., received) time of the recorded program, the effect of transmission differences between households can be reduced to thereby allow the non-real time content identifier 94 to use the same table to identify the program segments that were subjected to non-real time playback activity regardless of the location of the monitored home site 12, 14, 16 that exhibited the non-real time playback event.

The non-real time content identifier 94 may begin the search process by locating the program table (if any) corresponding to the recorded program. The located program table may then be searched for the segment(s) corresponding to the portion of the recorded program which experienced something other than real-time playback. For example, the non-real time content identifier 94 may compare the normalized start time of the recording interval of the recorded program at issue to the start times appearing in the program table associated with the corresponding program (see FIG. 5). Persons of ordinary skill in the art will readily appreciate that it is unlikely that the normalized start time of the recording interval that experienced non-real time activity will correspond exactly to one of the start times appearing in the program chart, because the audience member causing the non-real time effect is unlikely to send a command to, for example, fast forward, pause, or rewind, at precisely the normalized start time of a program segment. Instead, it is likely that the normalized start time of the recording interval at issue will fall within a range (e.g., +/−30 seconds) around a start time of one of the intervals. Therefore, the non-real time content identifier 94 is structured to find a match between the start time of the recording interval at issue and a start time of a segment appearing in the program table, if the corresponding start times are within some threshold amount (T) of one another.

Because the portion of the recorded program that experienced non-real time activity may encompass more than one segment of the recorded program, in addition to searching the program table (see FIG. 5) for a corresponding start time, the non-real time content identifier 94 also searches the program table associated with the recorded program for an end time that matches the normalized end time of the recording interval that was subjected to non-real time playback. As with the start time search, it is likely that the normalized end time of the recording interval at issue will fall within a range (e.g., +/−30 seconds) around an end time of one of the intervals. Therefore, the non-real time content identifier 94 is structured to find a match between the end time of the recording interval at issue and an end time of a segment appearing in the program table, if the corresponding end times are within some threshold amount (T) of one another.

Once a matching start time and a matching end time are identified in the program table, the non-real time content identifier 94 identifies the segment(s) corresponding to the substantially matching start and end times as the segment(s) of the recorded program that were subjected to non-real time playback. For instance, in the example of FIG. 5, if the start time of the recording interval that was subjected to non-real time activity substantially matches the start time of the segment entitled "commercial 2," and the end time of the recording interval substantially matches the end time of the segment entitled "commercial 2," then the non-real time content identifier 94 identifies the segment "commercial 2" as the portion of the recorded program that was subjected to non-real time playback (e.g., skipped or fast forwarded). As another example, if the start time of the recording interval that was subjected to non-real time activity substantially matches the start time of the segment entitled "commercial 2," and the end time of the recording interval substantially matches the end time of the segment entitled "content 2," then the non-real time content identifier 94 identifies both the segment entitled "commercial 2" and the segment entitled "content 2" as the portion of the recorded program that was subjected to non-real time playback (e.g., skipped or fast forwarded).

If the non-real time activity being analyzed by the non-real time content identifier 94 was an advancing event (e.g., skipping, fast forwarding, pausing or slow playing), then the recording interval will have a positive sign and the non-real time content identifier 94 will use the normalized playback time of the first created data structure in the pair of data structures 58, 70 associated with the playback interval as the start time and the normalized playback time of the second created data structure in the pair of data structures 58, 70 associated with the playback interval as the end time. If, on the other hand, the non-real time activity was a rewinding event, then the recording interval will typically have a negative sign (unless the rewind was very short (e.g., less than one half the length of the playback interval)) and the non-real time content identifier 94 will use the normalized playback time of the second created data structure in the pair of data structures 58, 70 associated with the playback interval as the start time and the normalized playback time of the first created data structure in the pair of data structures 58, 70 associated with the playback interval as the end time. This latter approach enables the non-real time content identifier 94 to record the segments of the recorded program encompassed within the rewound interval. Persons of ordinary skill in the art will appreciate, however, that, just because the segments were rewound, does not mean that all of those segments were watched. Therefore, if any of the rewound segments are subjected to further non-real time playback (e.g., rewinding, fast forwarding, pausing, and/or skipping), the apparatus 50 will log that activity for later reconciliation as explained below.

Persons of ordinary skill in the art will appreciate that alternative methods of identifying the segments of the recorded program that were subjected to non-real time playback activity may alternatively be employed. For example, rather than requiring a start or end time of the recording interval to respectively fall within a range around a start time and end time appearing in the program table, the non-real time content identifier 94 may alternatively search the program table to determine if the recording interval overlaps with at least a predetermined portion (e.g., 10%) of one or more of the known intervals reflected in that table. The non-real time content identifier 94 may then identify the segment(s) associated with the known interval(s) that are sufficiently overlapped by the recording interval that experienced non-real time playback as the segment(s) that were not played back in real time.

Irrespective of the methodology employed for determining the identities of the segments of the recorded program that were subjected to non-real time playback activity (e.g., fast forwarding, pausing, skipping, and/or rewinding), the non-real time content identifier 94 preferably records the determined identities of the segments in a recapture table such as the example recapture table shown in FIG. 6. In the example of FIG. 6, the recapture table includes two columns. A first column is used to store the identities of all segments of the recorded program that were advanced in time during the recording interval at a rate faster than real time. Thus, the first column stores the identities (in this example, represented by segment numbers), of any segments that the non-real time content identifier 94 identifies as having been skipped and/or fast forwarded. The second column of the recapture table of FIG. 6 is used to store the identities of all segments of the recorded program that were rewound.

As mentioned above, a segment of a recorded program that is initially skipped and/or fast forwarded may later be viewed in real time if a portion of the recorded program encompassing that segment is rewound. To determine if a portion of the recorded program that was passed at a rate greater than real time was viewed in real time as a result of rewinding the recorded program, the apparatus 50 is further provided with a recapture identifier 96. In the illustrated example, the recapture identifier 96 compares the segment names appearing in the first column of the recapture table of FIG. 6 with the segment names appearing in the second column of the recapture table of FIG. 6. Whenever the recapture identifier 96 encounters the same segment name in both columns, the recapture identifier 96 removes the pair of segment names from the table. The segment names remaining in the advanced column of the recapture table after the recapture identifier 96 has checked every entry of the advanced column for a corresponding entry in the rewound column, represent the segments that were skipped and/or fast forwarded without being recaptured by a rewind. The segment names remaining in the rewound column of the recapture table after the recapture identifier 96 has checked every entry of the advanced column for a corresponding entry in the rewound column, represent the segments that were rewound and reviewed.

It must be emphasized that the recapture identifier 96 cancels one segment name in each column of the recapture table when a match is identified. Thus, if the same segment name appears twice in the advanced column and once in the rewound column, the recapture identifier 96 will remove one instance of the segment name from the advanced column and the one instance of that segment name from the rewound column, but the second instance of the segment name will remain in the advanced column, because the second entry of the segment name in the advanced column indicates that the segment was again skipped and/or fast forwarded after the rewound event. For instance, in the example of FIG. 6, segment "5" was fast forwarded and/or skipped one time and rewound one time such that the fast forwarding/skipping event and rewinding event cancel each other out and, absent other data, segment "5" was played at real time one time.

Therefore, when the recapture identifier 96 processes the recapture table, it will remove both references to segment "5" from the recapture table. As a result, when the processing of the recapture table is complete, there will be no reference to segment "5" in the recapture table, thereby indicating that segment "5" was viewed in real time.

On the other hand, segment "8" appears twice in the advanced column and once in the rewound column because, although it was rewound once, it was fast forwarded twice (i.e., it was never played in real time). Therefore, when the recapture identifier 96 processes the recapture table of FIG. 6, it will remove one instance of the segment "8" from the advanced column and the only instance of segment "8" from the rewound column. As a result, when the processing of the recapture table of FIG. 6 is complete, there will be one reference to segment "8" in the advanced column, but no reference to that segment in the rewound column, thereby indicating that segment "8" was fast forwarded and/or skipped and not recaptured by a rewind event.

In another example, segment "7" only appears in the rewound column of the example recapture table of FIG. 6. As a result, when the processing of the recapture table of FIG. 6 is complete, there will be one reference to segment "7" in the rewound column, but no reference to that segment in the advanced column, thereby indicating that segment "7" was twice viewed in real time.

Persons of ordinary skill in the art will appreciate that the apparatus 50 may be located in a single device (e.g., the digital recording device 24) or distributed across multiple devices. For instance, in the example of FIG. 1, the apparatus 50 may be implemented by the digital recording device 24, the data logging device 26, and/or the central office 10. In a more specific example, the time stamper 52, a portion of the memory 54, and the presentation time retriever 56 are implemented by the digital recording device 24, and the interval detector 90, the difference detector 92, the non-real time content identified 94, a portion of the memory 54, and the recapture identifier 96 are implemented by the data logging device 26 and/or the central office 10. If the interval detector 90, the difference detector 92, the non-real time content identified 94 and the recapture identifier 96 are implemented by the data logging device 26, the processed data entry structures 50, 78 and recapture table(s) (see FIG. 6) may be periodically exported to the central office via the network 18 for compilation with data from other home sites 12, 14, 16 and/or further analysis. If the interval detector 90, the difference detector 92, the non-real time content identified 94 and the recapture identifier 96 are implemented by the central office 10, the data logging device 26 may be excluded or may function as a store and forward repository for the log entry data structures 58, 70.

Flowcharts representative of example machine readable instructions for implementing the apparatus 50 of FIG. 2 are shown in FIGS. 7-14. In this example, the machine readable instructions comprise one or more programs for execution by one or more processors such as the processor 1012 shown in the example device 1000 discussed below in connection with FIG. 15. The program(s) may be embodied in software stored on a tangible medium such as a CD-ROM, a floppy disk, a hard drive, a digital versatile disk (DVD), or a memory associated with a processor, but persons of ordinary skill in the art will readily appreciate that the entire program(s) and/or parts thereof could alternatively be executed by a device other than a processor and/or embodied in firmware or dedicated hardware in a well known manner. For example, any or all of the time stamper 52, the presentation time retriever 56, the interval detector 90, the difference detector 92, the non-real time content identifier 94, and/or the recapture identifier 96 could be implemented by software, hardware, and/or firmware. Further, although the example program(s) are described with reference to the flowcharts illustrated in FIGS. 7-14, persons of ordinary skill in the art will readily appreciate that many other methods of implementing the example apparatus 50 may alternatively be used. For example, the order of execution of the blocks may be changed, and/or some of the blocks described may be changed, eliminated, or combined.

Figure 7:
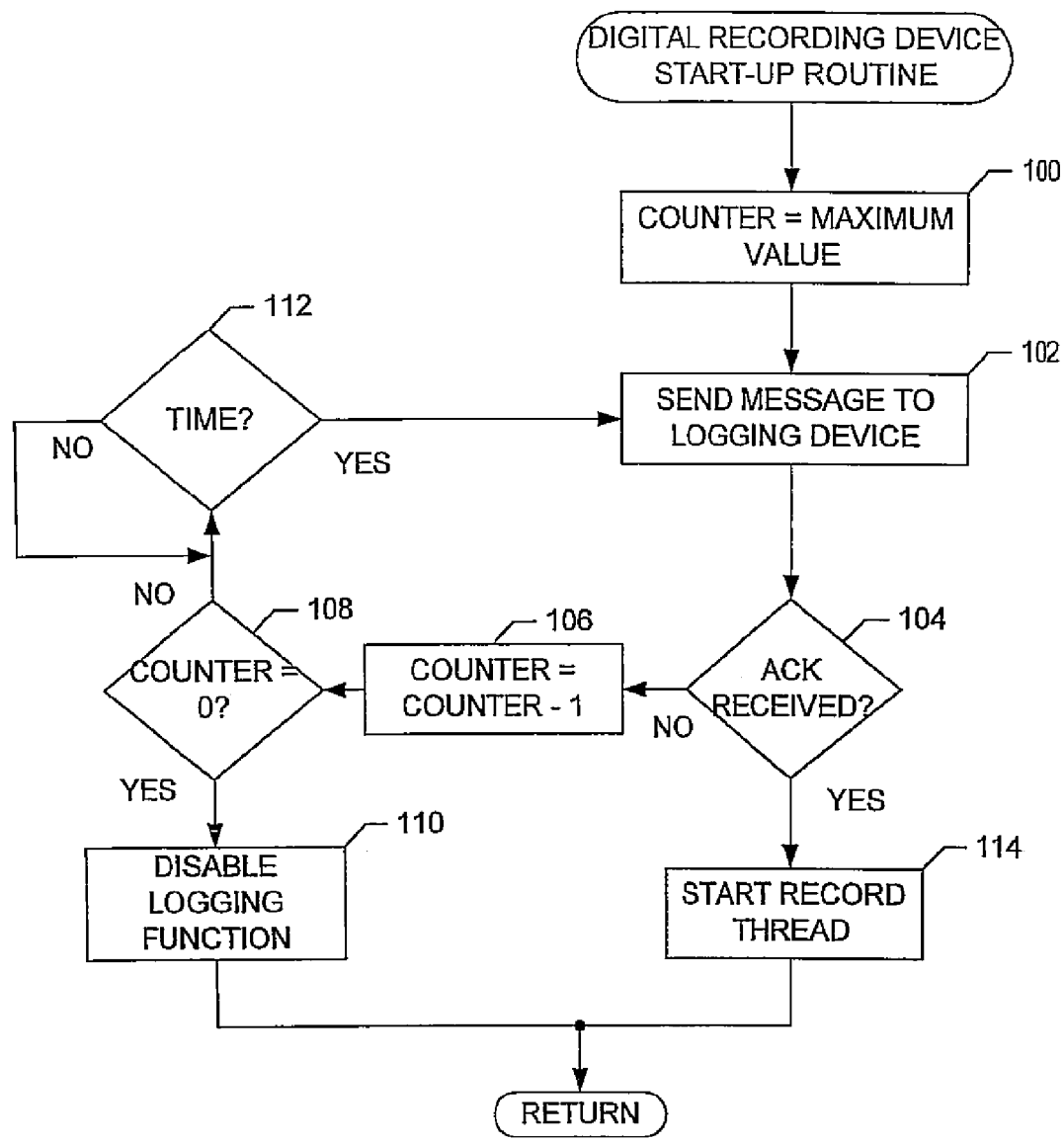
FIG. 7 is a flowchart representative of example machine readable instructions that may be executed by the digital recording device of FIG. 1 to determine if a data logging device is coupled thereto.
Figure 8:
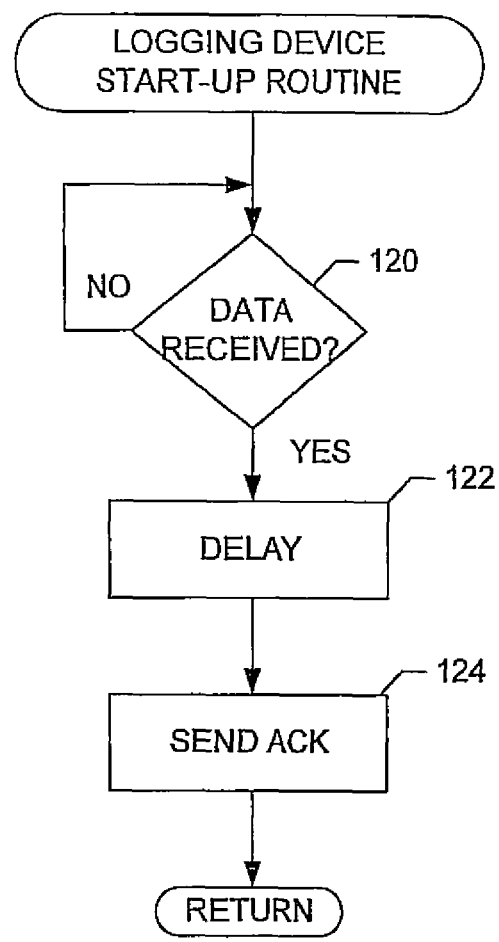
FIG. 8 is a flowchart representative of example machine readable instructions that may be executed by the data logging device of FIG. 1 to advise the digital recording device of its presence.

The programs of FIGS. 7 and 8 may be used in examples wherein the data logging device 26 is used to store, analyze and/or forward the log entry data structures 58, 70 output by the digital recording device 24. In such an example, the digital recording device 24 may execute the program of FIG. 7 and the data logging device 26 may execute the program of FIG. 8 to enable the digital recording device 24 to determine if the data logging device 26 is connected and, thus, if logging of user activity is desired. The digital recording device 24 and the data logging device 26 may be connected in any desired manner. For example, they may be connected via a serial connection (e.g., a DB-9 connection or a USB connection).

Irrespective of how the digital recording device 24 and data logging device 26 are connected, the program of FIG. 7 begins at block 100 where the processor of the digital recording device 24 sets an attempt counter to a maximum value (e.g., 30). The processor of the digital recording device 24 then send a message to the digital logging device 26 (block 102) to determine if a digital logging device 24 is connected to its output port (e.g., a DB-9 serial port). If the digital recording device 24 receives an acknowledgement signal back from the data logging device 26 (block 104), control advances to block 114. Otherwise, control advances to block 106.

Assuming for purposes of discussion that an acknowledgement has not been received (block 104), the processor of the digital recording device 24 decrements the attempts counter by one (block 106). If the attempts counter has reached zero (block 108), it is determined that no data logging device 26 is coupled to the digital recording device 24. As a result, the logging function of the digital recording device 26 is disabled such that no usage data is collected and stored in the data structures 58, 70 (block 110). The program of FIG. 7 then terminates.

If, on the other hand, the attempts counter has not reached zero (block 108), then control advances to block 112. At block 112, the processor of the digital recording device 24 determines if sufficient time has passed to again try to contact the logging device 26. When sufficient time has passed (block 112), control returns to block 103 where the processor of the digital recording device 24 sends another message to the data logging device 24. Control continues to loop through blocks 102-112 until the attempt counter reaches zero (block 108) and the logging function is disabled (block 110), or until an acknowledgement message is received back from an attached data logging device 26 (block 104).

Figure 9:
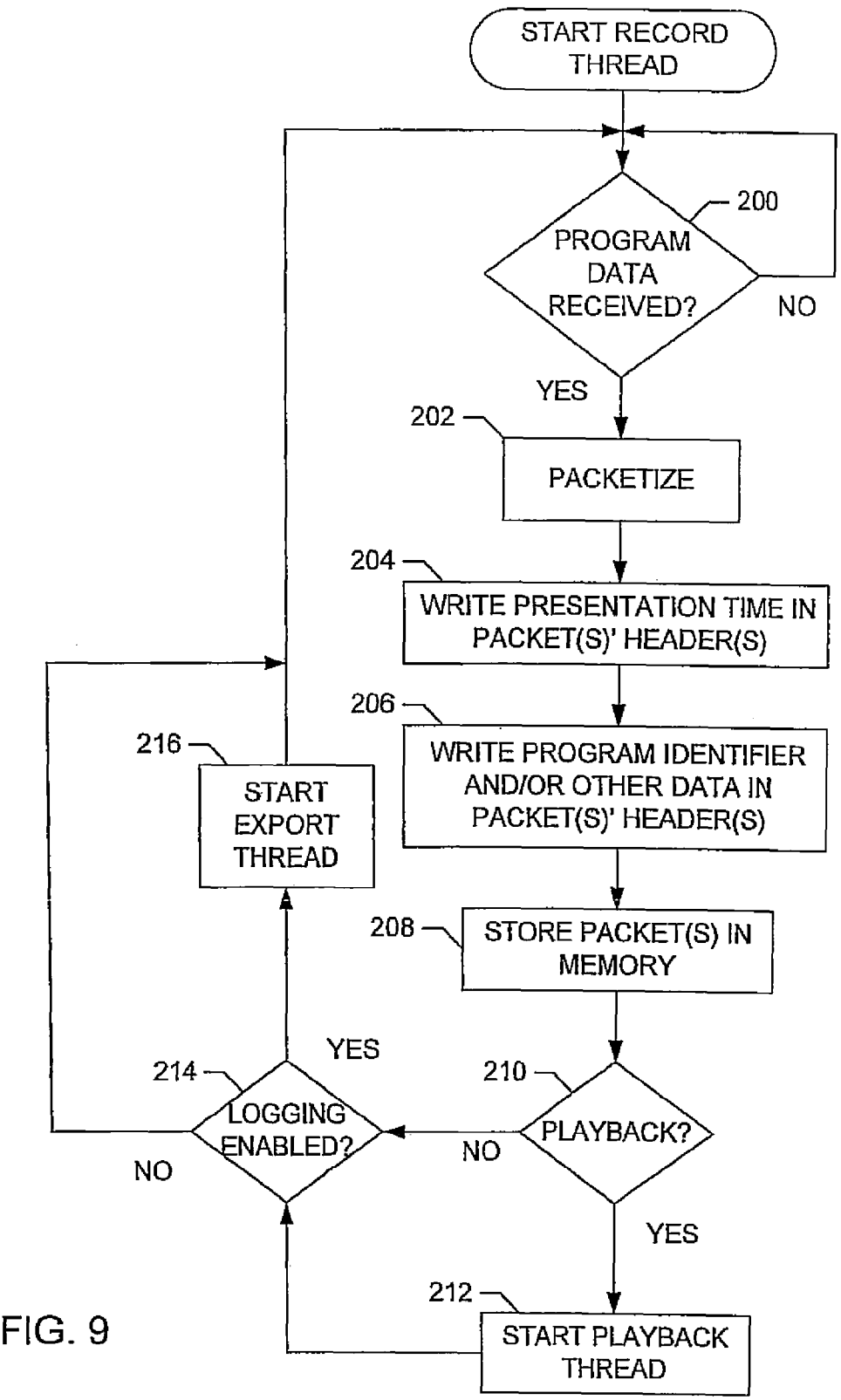
FIG. 9 is a flowchart representative of example machine readable instructions that may be executed to implement the apparatus of FIG. 2.

If an acknowledgement signal is received back from a data logging device (block 104), the processor of the digital recording device 24 starts a recording thread as explained below in connection with FIG. 9.

FIG. 8 illustrates a program that may be executed by the data logging device 26 at start-up. The program begins at block 120 where the processor of the data logging device 26 enters a loop wherein the data logging device 26 waits to receive data from the digital recording device 24. If a data signal is received (block 120), the processor of the data logging device 26 waits a predetermined length of time (block 122) and then sends an acknowledgement signal back to the digital recording device 24 (block 124). (The returned acknowledgement signal is the signal the digital recording device is seeking at block 104 of FIG. 1.) The data logging device 26 then stores, analyzes, and/or forwards the data structures 58, 70 received from the digital recording device 24 as explained in further detail below.

From the foregoing, persons of ordinary skill in the art will appreciate that the example of FIGS. 7-8 employs a handshaking method wherein the presence or absence of an acknowledgement signal is used to detect if a data logging device 26 is coupled to a digital recording device 24. In the example of FIGS. 7-8, if no data logging device 26 is attached, the digital recording device 24 will not log data reflecting its usage pattern. In the illustrated example, once the data logging functionality is disabled, there will be no attempt to re-enable the same unless a re-set or power-up event of the digital recording device 24 occurs.

Persons of ordinary skill in the art will further appreciate that the programs of FIGS. 7-8 may be eliminated in examples wherein the digital recording device 24 alone implements the apparatus 50 and/or in examples in which the digital recording device 24 implements the apparatus 50 in cooperation with the central office 10 without the use of a data logging device 26. Although as explained above, there are numerous ways to implement the functionality of the apparatus 50, for simplicity of explanation, the discussion of FIGS. 9-14 below assumes the presence of a data logging device 26 wherein the data logging device 26 implements the interval detector 90, the difference detector 92, the non-real time content identified 94 and the recapture identifier 96, and the data logging device periodically exports the data it collects and analyzes to the central office 10 for compilation with data from other monitored sites 12, 14.

Assuming that the digital recording device 24 has initiated the record thread (block 114, FIG. 7), the record thread begins by entering a loop wherein it awaits the receipt of program data by the digital recording device 24 (block 200). Program data may be received from many sources. For example, it may be tuned data developed by a tuner of the digital recording device 24, it may be data received by the digital recording device 24 from an external device via, for example, an RF input, a Satellite input, or an S-video input, etc. When program data is received (block 200), the digital recording device 24 packetizes the received program data into one or more datastreams (block 202). For example, if the digital recording device 24 is a TiVo® digital/personal video recorder, the received program data may be packetized into a stream of video packets and a stream of audio packets. The time stamper 52 then writes the present time into one or more headers of the packets in the datastream(s) (block 204). The recording of these presentation times in the datastream(s) may be intended, for example, for use in synchronizing a video datastream and an audio datastream, but is also used for identifying non-real time activity as explained further below.

Other data may also be written into the datastream(s) (block 206). For example, any or all of a program identifier, a digital recording device serial number, the input port from which the data was received, the channel number, the station name, the program name, and the station identifier associated with the program being recorded may be recorded in the datastream(s). After the packet(s) are completely populated (block 206), they are stored in the memory 54 (block 208).

The digital recording device 24 then determines if a playback command (e.g., play, rewind, pause, fast forward, etc.) has been received (block 210). If so, the digital recording device 24 initiates the playback thread (block 212) as explained below in connection with FIG. 10. Otherwise, control advances to block 214.

At block 214, the digital recording device 24 determines if the logging functionality has been initiated. If so, the digital recording device 24 initiates the export thread as explained below in connection with FIG. 11 (block 216). Otherwise, if the logging functionality has not been initiated (block 214), control returns to block 200 without passing through block 216.

Persons of ordinary skill in the art will appreciate that typically only one playback thread and one export thread will execute at a given time.

Figure 10:
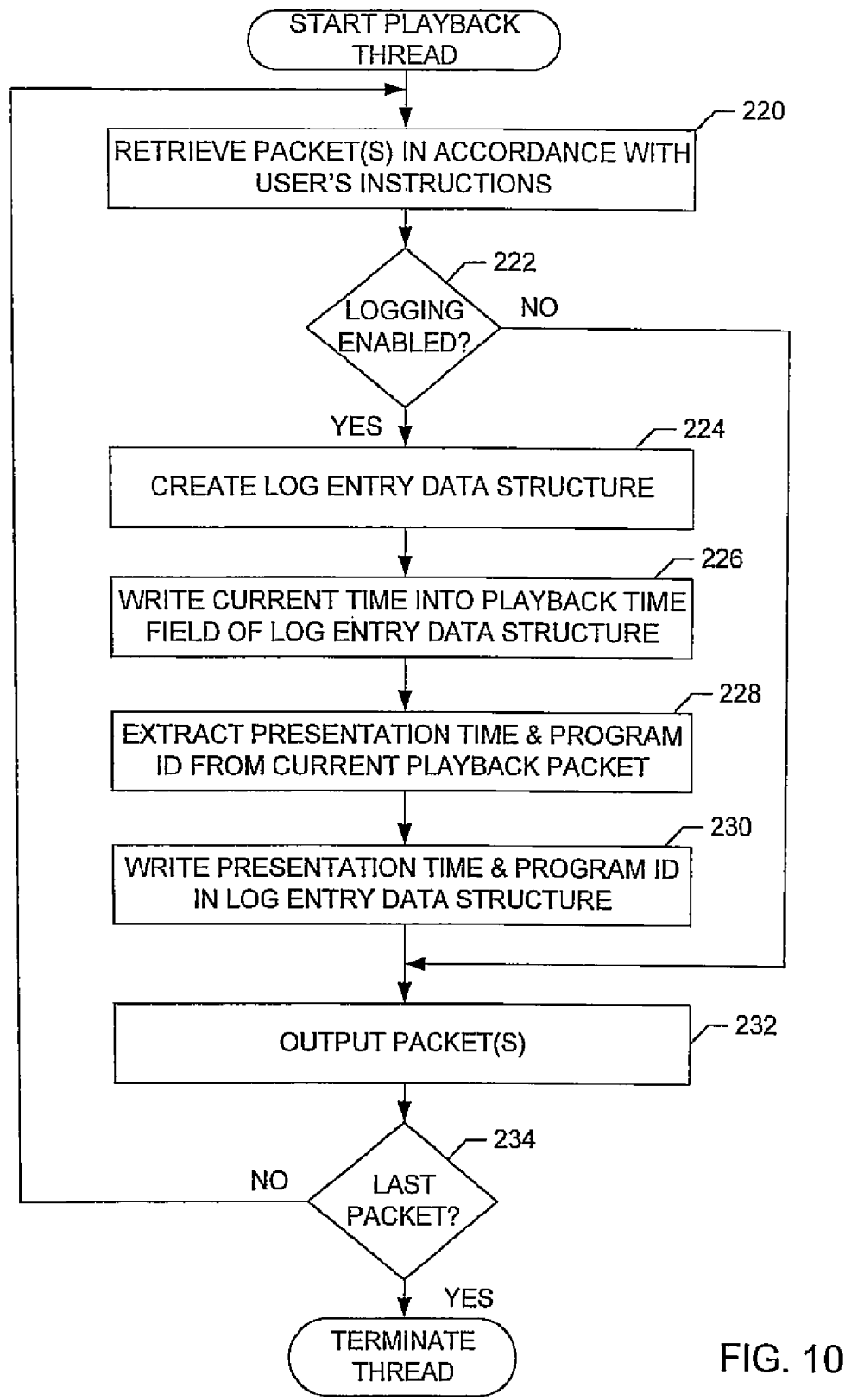
FIG. 10 is a flowchart representative of additional example machine readable instructions that may be executed to implement the apparatus of FIG. 2.

Assuming a playback thread has been initiated, at block 220 of FIG. 10, the digital recording device 24 retrieves the packet(s) of one or more datastream(s) corresponding to the program specified by the user from the memory 54 for playback in accordance with the user's instructions. The digital recording device 24 then determines if the logging functionality is enabled by, for example, checking a flag set at block 110 of FIG. 7 (block 222). If the logging functionality is not enabled (block 206), control advances to block 232. Otherwise control proceeds to block 224.

Assuming for purposes of discussion that the logging functionality is enabled (block 222), the digital recording device 24 creates a log entry data structure (e.g., data structure 58 or data structure 70) (block 224). The time stamper 52 then writes one or more of the current time and date into the playback fields 60, 62 of the data structure 58, 70 (block 226). Control then advances to block 228.

At block 228, the presentation time retriever 56 extracts the presentation/recording time from the packet(s) currently being played (block 228). Other data may also be extracted from the packet(s) (block 228). For example, any or all of a program identifier, a digital recording device serial number, the input port from which the data was received, the channel number, the station name, the program name, and the station identifier associated with the recorded program may be extracted from the packet(s) that are currently being played.

The data extracted by the presentation time retriever 56 is written into the corresponding field of the log entry data structure 58, 70 such that the extracted data is associated with the playback time of the corresponding packet(s) (block 230). Control then advances to block 232.

Irrespective of whether control reaches block 232 from block 222 or block 230, at block 232 the digital recording device 24 outputs the packet(s) to an information presenting device such as a television. The digital recording device 24 then determines if all of the packets of the recorded program requested by the user of the digital recording device 24 have been output (block 234). If so, the playback thread terminates. Otherwise, control returns to block 220.

Control continues to loop through blocks 220-234 until all of the packet(s) associated with the recorded program requested by the consumer have been output (block 234). The playback thread then terminates as explained above.

Figure 11:
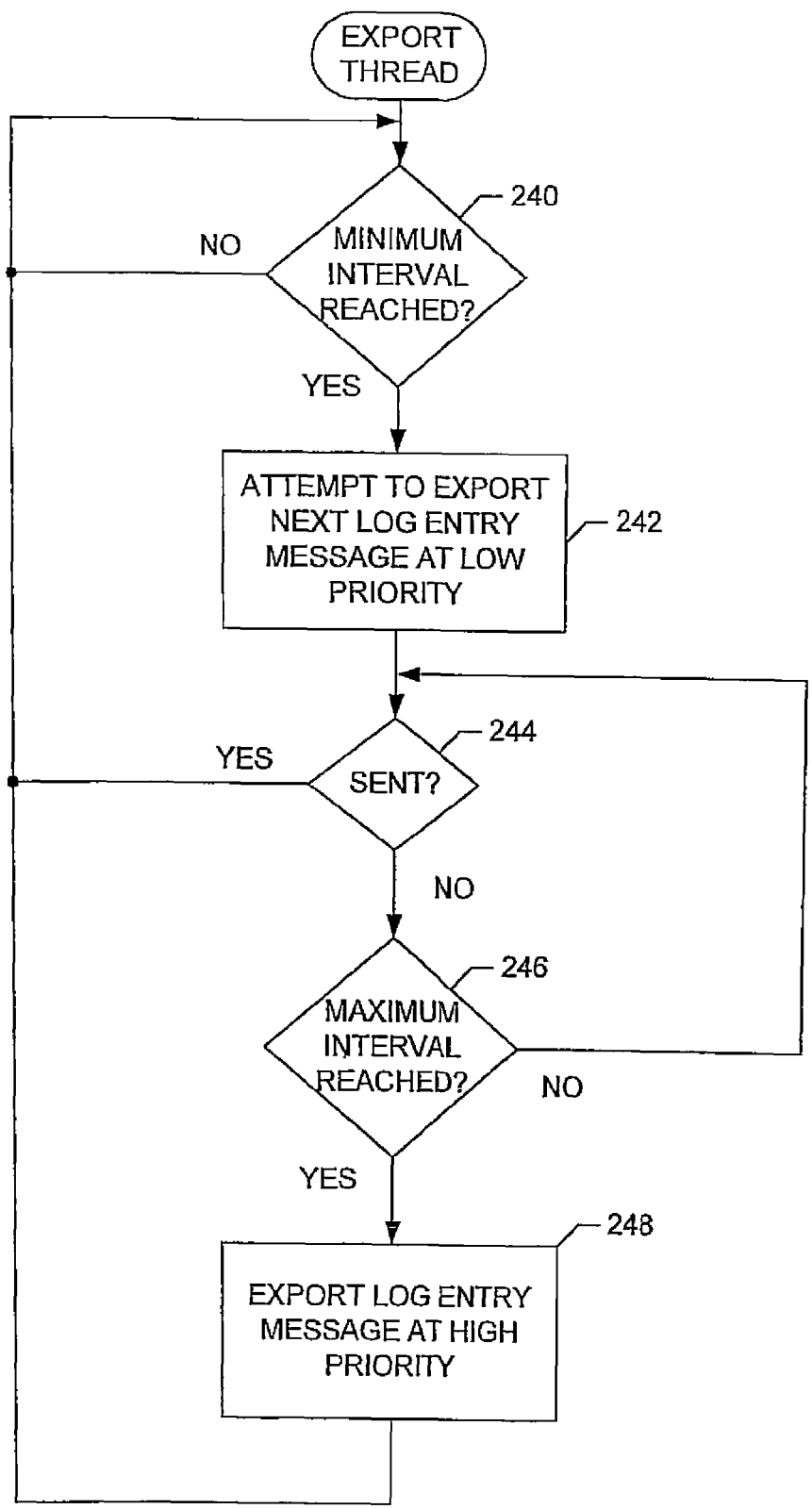
FIG. 11 is a flowchart representative of more example machine readable instructions that may be executed to implement the apparatus of FIG. 2.

Assuming the export thread has been initiated, at block 240 of FIG. 11, the digital recording device 24 determines if a minimum interval of time has passed since the last message containing a log entry data structure was exported to, for example, the data logging device 26. If not, control remains at block 240 until that time interval has passed. The digital recording device 24 then attempts to export the next message containing a log entry data structure 58, 70 (block 242). The message sent at block 242 is queued in a low priority thread such that it does not impact the perceptible usage of the device 24 by the consumer. The queue may contain multiple messages. The messages contained in the queue may be sent in the order they were created or out of order. In the case where out or order exporting is possible, sequence numbers may be used to re-order the messages upon receipt.

At block 244, the digital recording device 24 determines if the message is still pending in the queue. If the message has been sent, control returns to block 240 to await the time to send the next message containing the next log entry data structure 58, 70. Otherwise, the digital recording device 24 determines if the maximum time interval (e.g., 30 seconds) between exporting of messages containing log entry data structures has passed (block 246). If that allotted time has not passed (block 246), control returns to block 244. Otherwise, if the maximum permitted delay in transmitting a queued message has passed (block 246), the message containing the excessively delayed message containing the log entry data structure is converted to a high priority message and immediately exported (block 248). Control then returns to block 240.

Control continues to loop through blocks 240-248 until the export thread is terminated by, for example, turning off the digital recording device 24. Thus, once the export thread is initiated (block 216, FIG. 9), it will continue to export messages containing log entry data structures 58, 70 until operation of the digital recording device 24 is interrupted. Since, in the illustrated example, a data structure 58, 70 is created every 2.7 seconds, the digital recording device 24 may export up to 32,000 data structures 58, 70 per day describing what the user is viewing via the digital recording device 24 at any given time. Of course, asynchronous models which create data structures based on detected events in addition to or in place of the expiration of set time intervals would export different quantities of data structures.

Figure 12A:
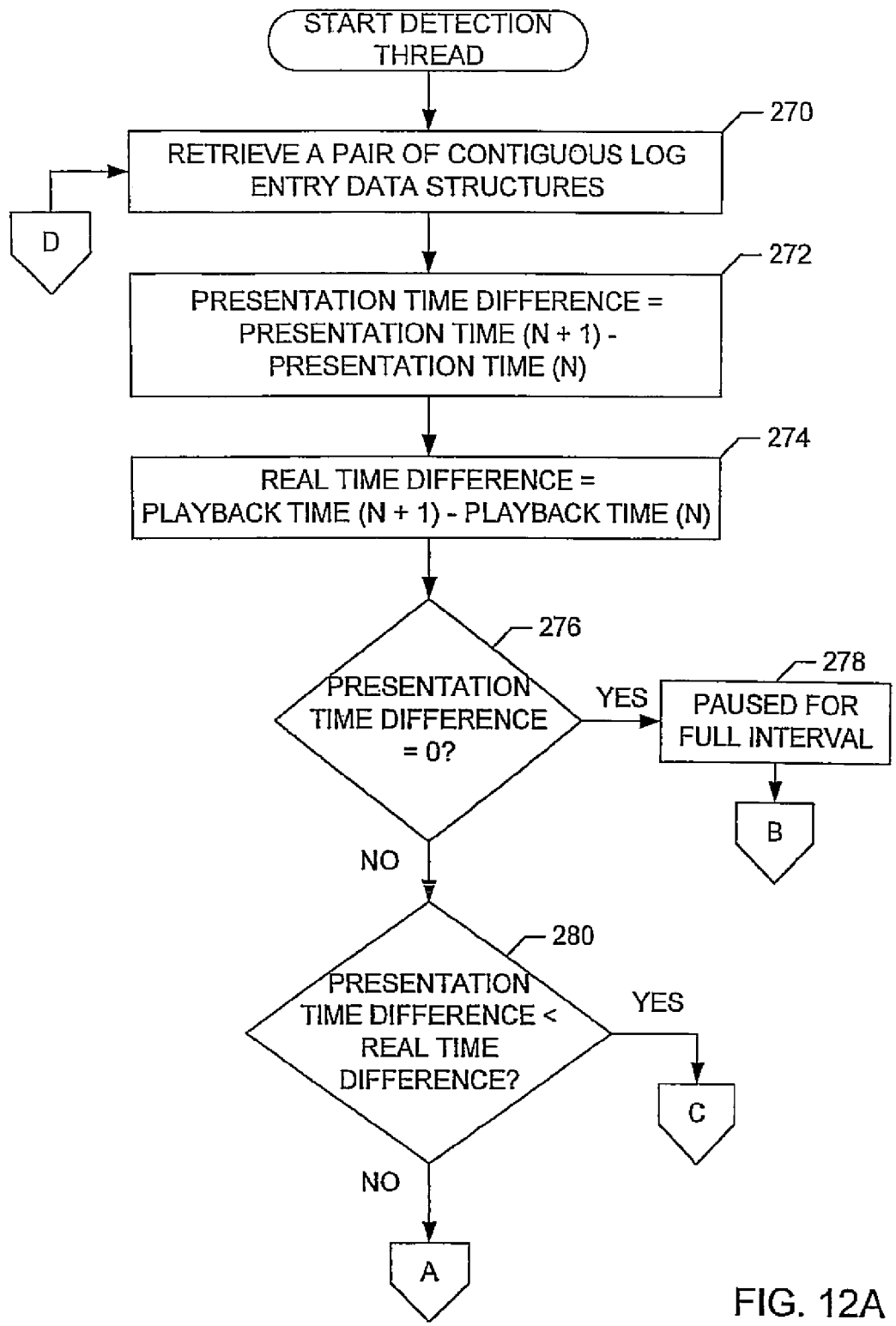
FIGS. 12A-12C are a flowchart representative of additional example machine readable instructions that may be executed to implement the apparatus of FIG. 2.
Figure 12B:
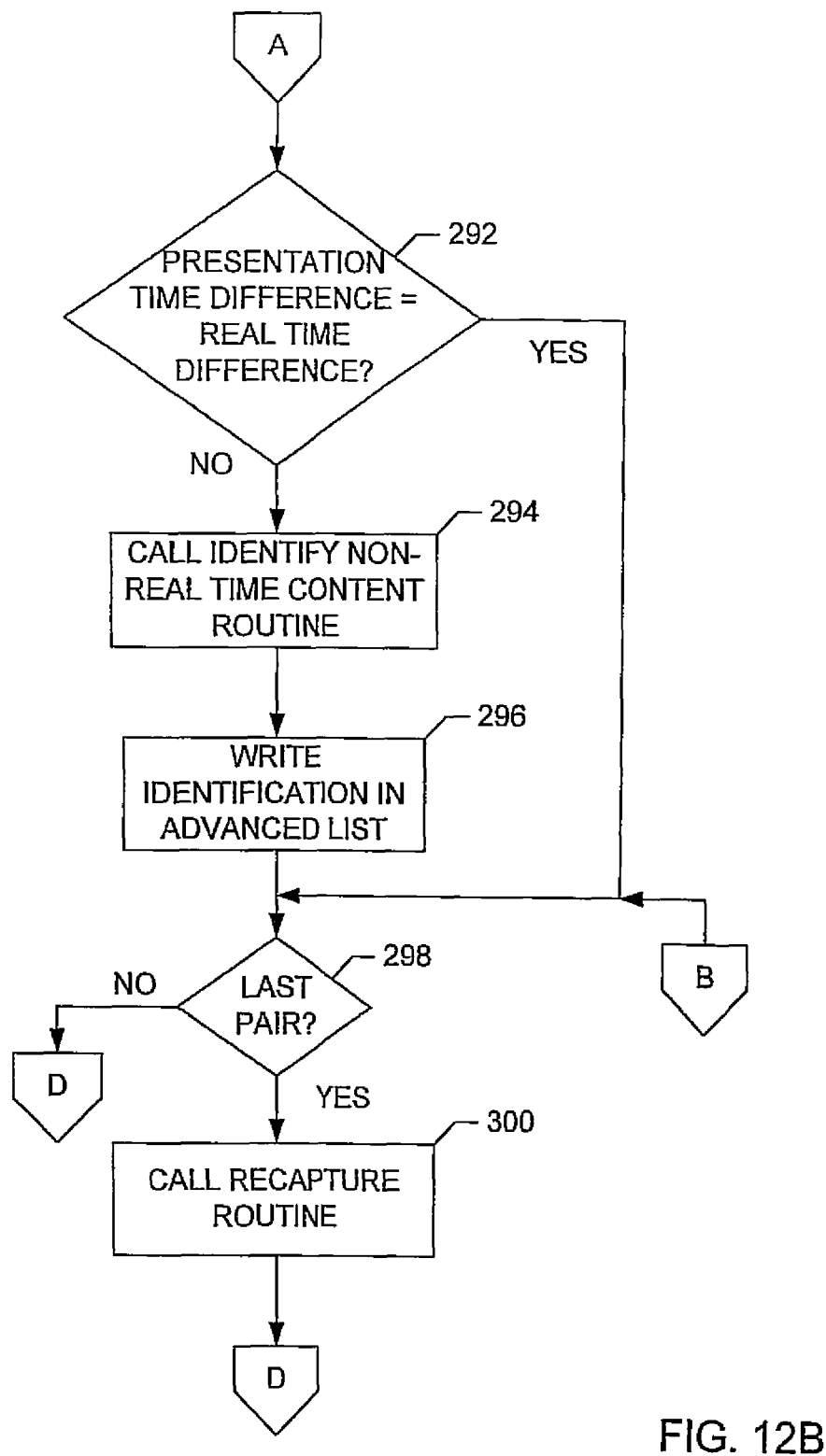
Figure 12C:
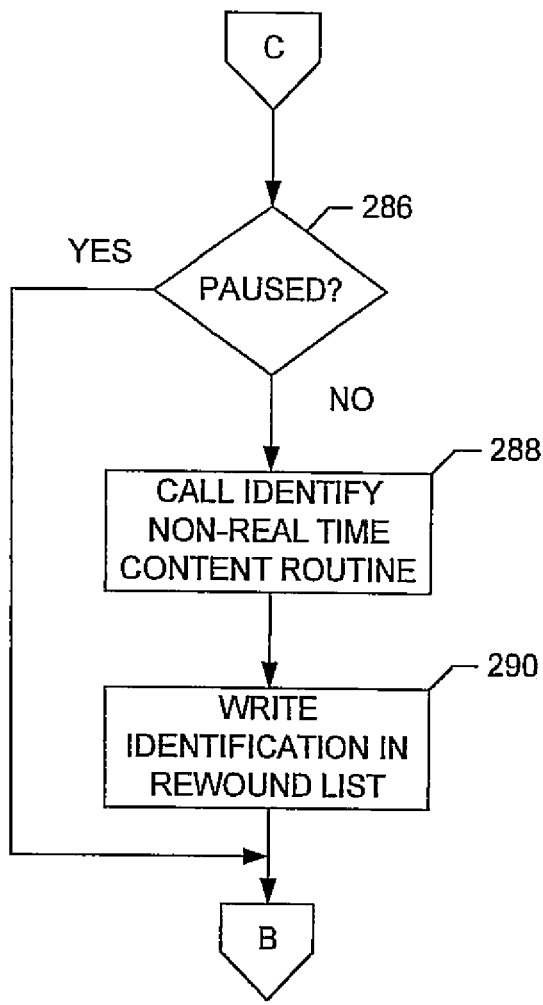

An example program for implementing the interval detector 90 and the difference detector 92 is shown in FIGS. 12A-12C. The example program of FIGS. 12A-12C may be executed, for example, by the data logging device 26 and/or the central office 10. Alternatively, the program of FIGS. 12A-12C could be executed by the digital recording device 24.

The program of FIGS. 7A-7C begins at block 270 where the interval detector 90 retrieves a pair of contiguous log entry data structures 58, 70. The interval detector 90 then calculates a presentation time difference (i.e., a recording time interval) by subtracting the presentation time value recorded in the older data structure 58, 70 from the presentation time value recorded in the newer data structure 58, 70 (block 272). The interval detector 90 may then calculate a real time difference (i.e., a playback interval) between the data structures 58, 70 by subtracting the playback time value recorded in the older data structure 58, 70 from the playback time value recorded in the newer data structure 58, 70 (block 274). As explained above, block 272 may be eliminated if the log entry data structures 58, 70 are created at a constant, fixed interval so that the real time difference between log entry data structures 58, 70 is always a known constant.

After the recording time interval and playback time intervals are obtained (blocks 272 & 274), the difference detector 92 determines if the presentation time difference (i.e., the recording interval) between the pair of log entry data structures 58, 70 is zero (block 276). If so, the recorded program was paused for the entire playback interval between the data structures (block 278), that fact is logged and control advances to block 298 (FIG. 12B). At block 298, the interval detector 90 determines is the last pair of log entry data structures 58, 70 have been analyzed. If not, control returns to block 270 (FIG. 12A). Otherwise, control advances to block 300 where the recapture identifier 96 is invoked as explained below in connection with FIG. 14.

If the presentation time difference (i.e., the recording interval) between the pair of log entry data structures 58, 70 is not zero (block 276), a full interval pause did not occur and control advances to block 280.

At block 280, the difference detector 92 determines if the recording interval is less than the playback interval. If the recording interval (i.e, the presentation time difference) is smaller than the playback interval (i.e., the real time interval) between the data structures 58, 70 (block 280), the corresponding portion of the recorded program has been paused or rewound and control advances to block 286. If the presentation time difference is a positive value, then a brief pause event or slow motion playback occurred, the same is noted, and control returns to block 298 of FIG. 12B.

If the presentation time difference is negative, a rewind event has occurred and control advances to block 288. At block 288, the non-real time content identifier 94 is invoked. As explained below in connection with FIGS. 13A-13B, the non-real time content identifier 94 returns an identification of the segment(s) of the recorded program that were rewound. The returned segment names are written in the rewound column of a recapture table such as that shown in FIG. 6 (block 290). Control then advances to block 298 of FIG. 12B as explained above.

If the recording interval is not less than the playback interval (block 280, FIG. 12A), control advances to block 292 of FIG. 12B. At block 292, the difference detector 92 determines if the recording interval is equal to the playback interval. If the recording interval (i.e, the presentation time difference) is not equal to the playback interval (i.e., the real time interval) between the data structures 58, 70 (block 292), the corresponding portion of the recorded program has been skipped and/or fast forwarded and control advances to block 294. At block 294, the non-real time content identifier 94 is invoked. As explained below in connection with FIGS. 13A-13B, the non-real time content identifier 94 returns an identification of the segment(s) of the recorded program that were skipped and/or fast forwarded. The returned segment names are written in the advanced column of a table such as that shown in FIG. 6 (block 296). Control then advances to block 298.

If the recording interval (i.e, the presentation time difference) is equal to the playback interval (i.e., the real time interval) between the data structures 58, 70 (block 292), the corresponding portion of the recorded program has not been skipped and/or fast forwarded and control advances directly to block 298.

Control continues to loop through blocks 270-298 until every pair of log entry data structures 58, 70 in a block of such data (e.g., a block of data corresponding to 30 minutes of monitoring) have been analyzed for non-real time activity (block 298). When that occurs, the recapture identifier 96 is invoked to operate on that block of data (block 300). After the recapture identifier 96 analyzes the data as explained below in connection with FIG. 14, control returns to block 270 to start the analysis of the next block of data.

As mentioned above, the non-real time content identifier 94 is invoked at block 288 of FIG. 12C and block 294 of FIG. 12B. The operation of the non-real time content identifier 94 will now be explained in connection with FIGS. 13A-13B. The identify non-real time content routine begins at block 312 when the non-real time content identifier 94 retrieves the identity of the recorded program from one of the corresponding log entry data structures 58, 70 and a program table such as the example program table shown in FIG. 5 for the recorded program from a database of program tables. The non-real time content identifier 94 then retrieves the recording times for the portion of the recorded program that experienced non-real time activity from the log entry data structures 58, 70 (block 314). The retrieved times are then normalized by, for example, subtracting the start time of the recorded program as recorded in the log entry data structures 58, 70 from the recording times retrieved from the log entry data structures 58, 70 (block 316).

Figure 13A:
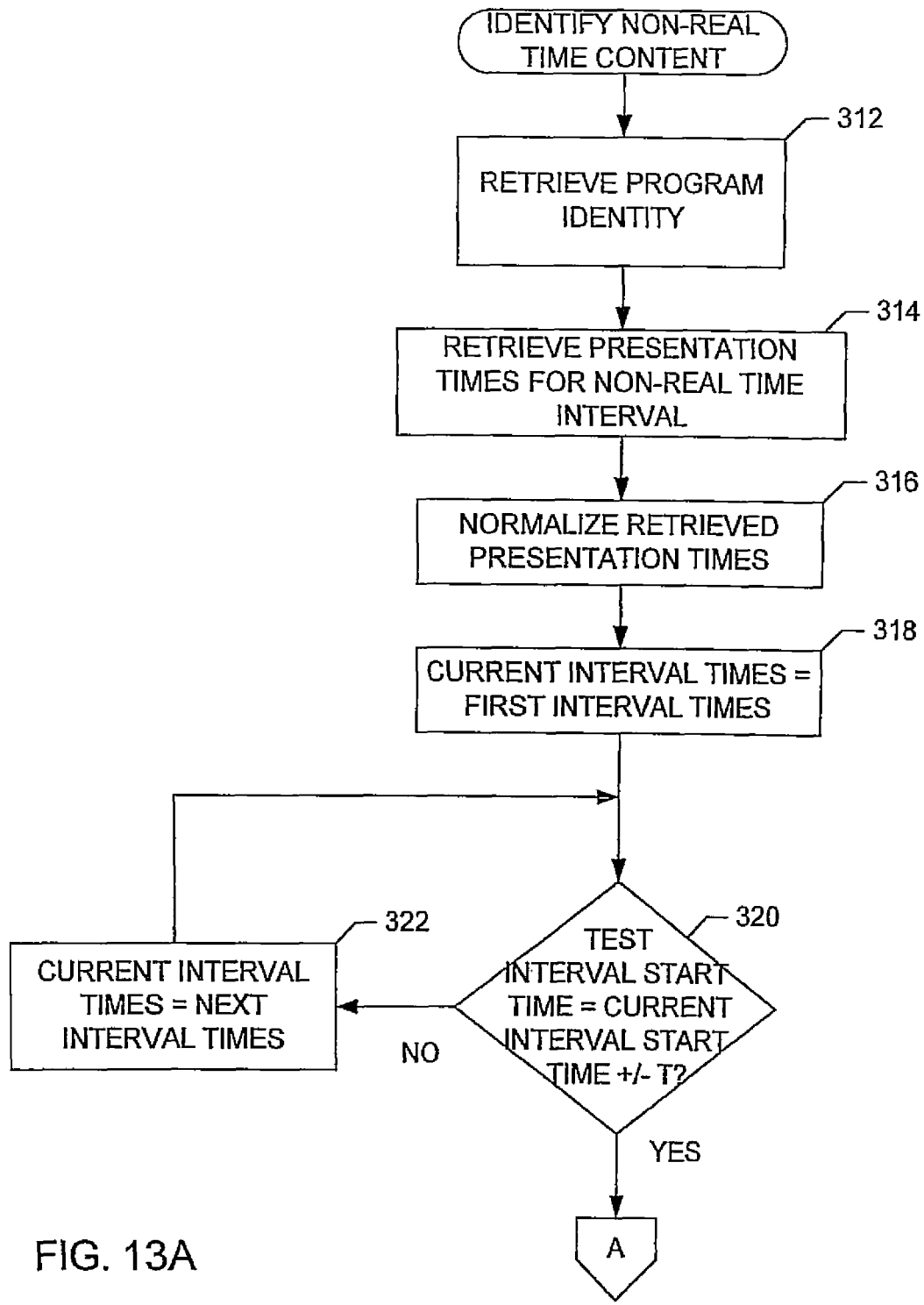
FIGS. 13A-13B are a flowchart representative of still more example machine readable instructions that may be executed to implement the apparatus of FIG. 2.
Figure 13B:
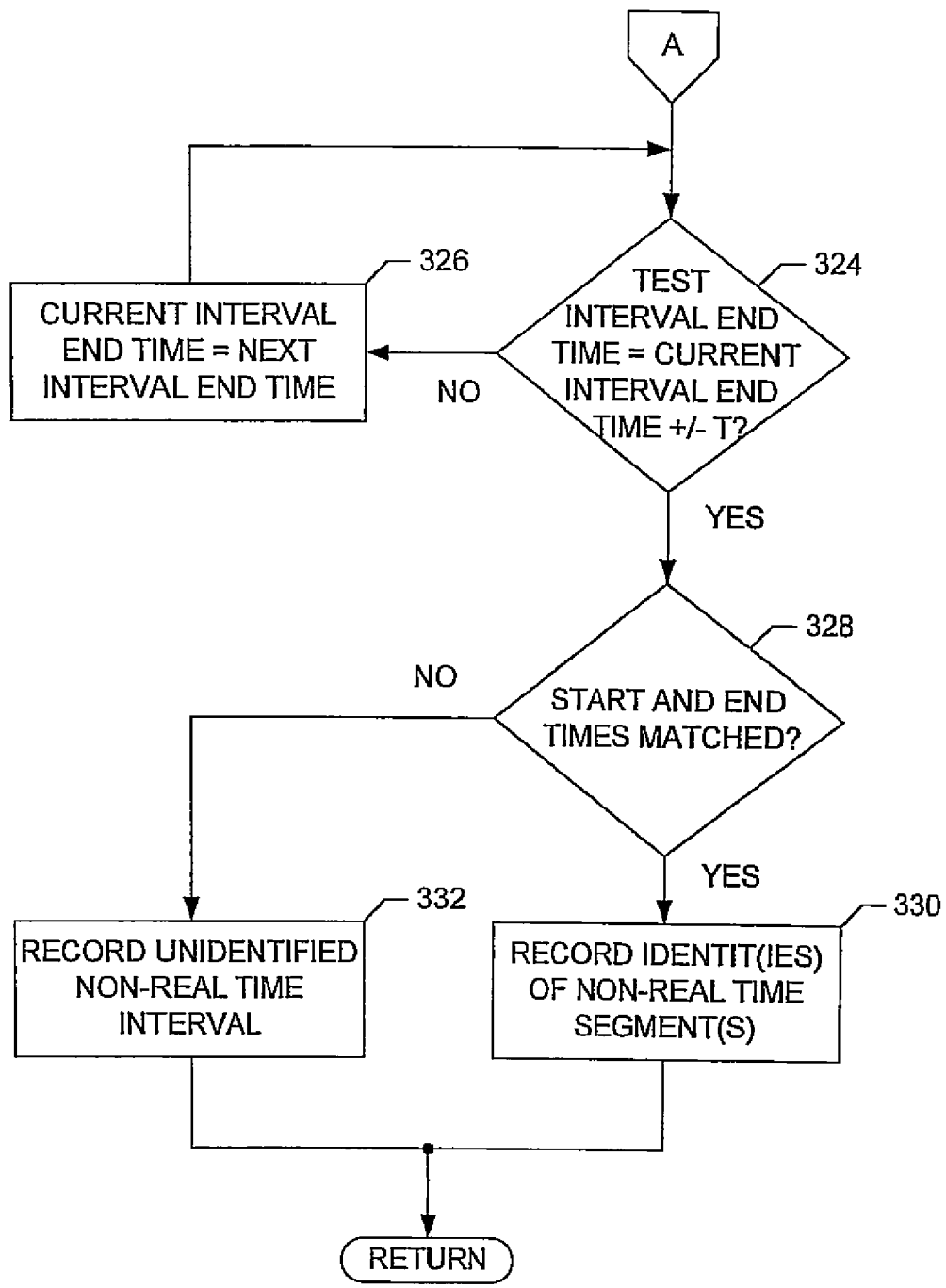
Figure 14:
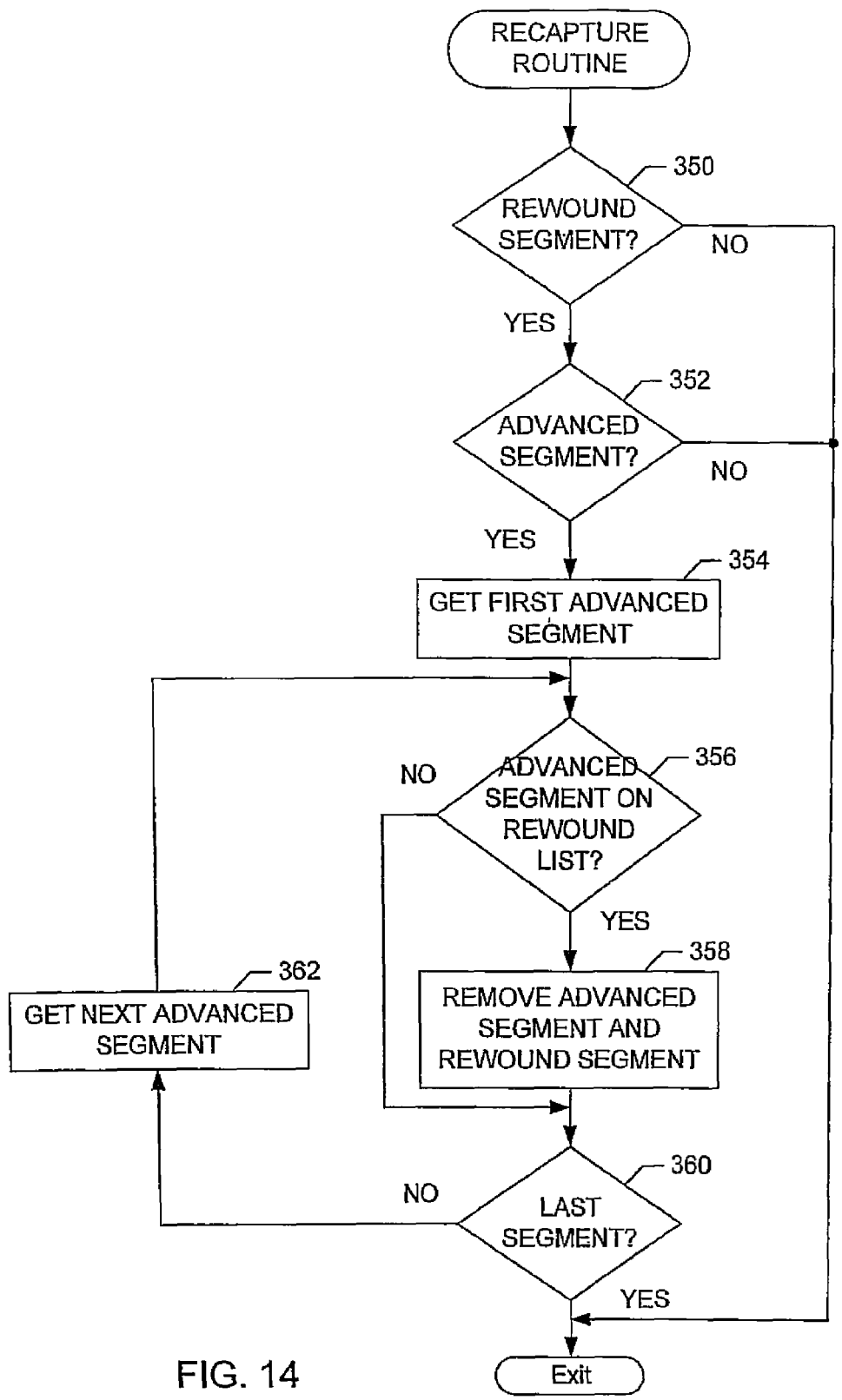
FIG. 14 is a flowchart representative of still more example machine readable instructions that may be executed to implement the apparatus of FIG. 2.

Once the retrieved times are normalized (block 316), a pointer is set to point to the first segment identified in the program table corresponding to the recorded program (see FIG. 5) and the start and end times of the pointed to interval are retrieved from the program table (block 318). The non-real time content identifier 94 then determines if the start time for the interval being identified is substantially equal to (e.g., falls within some range of) the start time of the interval pointed to in the program table (block 320). If not, the pointer is moved to point to the next segment in the program table (block 322), and control returns to block 320. Control continues to loop through blocks 320-322 until a match between the start time for the interval being identified and the start time of the interval pointed to in the program table occurs (block 320). When a match occurs, the segment corresponding to the matched start time is recorded and control then advances to block 324 (FIG. 13B).

At block 324, the non-real time content identifier 94 determines if the end time for the interval being identified is substantially equal to (e.g., falls within some range of) the end time of the interval pointed to in the program table. If not, the pointer is moved to point to the next segment in the program table (block 326), and control returns to block 324. Control continues to loop through blocks 324-326 until a substantial match between the end time for the interval being identified and the end time of the interval pointed to in the program table occurs (block 324). When a match occurs, the segment corresponding to the matched end time is recorded and control then advances to block 328.

If the non-real time content identifier 94 has recorded a segment corresponding to the start time of the portion of the recorded program that experienced non-real time activity and a segment corresponding to the end time of the portion of the recorded program that experienced non-real time activity (block 328), the non-real time content identifier 94 records the identities of the segment corresponding to the start time, the segment corresponding to the end time, and any segment(s) falling between the start time and the end time of the portion of the recorded program that experienced non-real time activity. Persons of ordinary skill in the art will appreciate that if the start and end times identified at block 320 and 324 correspond to a single segment, then only one segment is recorded at block 330. With the segment identity(ies) recorded (block 330), control returns to the calling block (i.e., block 288 or block 294).

If the non-real time content identifier 94 has not recorded a segment corresponding to the start time of the portion of the recorded program that experienced non-real time activity and a segment corresponding to the end time of the portion of the recorded program that experienced non-real time activity (block 328), the non-real time content identifier 94 records the identity of the portion of the recorded program that experienced non-real time activity as "unidentified segment" (block 332). Control then returns to the calling block (i.e., block 288 or block 294).

It will be appreciated by persons of ordinary skill in the art that the start time of the portion of the recorded program employed at block 320 is the normalized start time retrieved from the earlier created log entry data structure 58, 70 if the non-real time content identifier 94 is invoked from block 294 of FIG. 12B (i.e., a skipped and or fast forwarded portion is being identified). Similarly, the end time of the portion of the recorded program employed at block 324 is the normalized end time retrieved from the later created log entry data structure 58, 70 if the non-real time content identifier 94 is invoked from block 294 of FIG. 12B (i.e., a skipped and or fast forwarded portion is being identified).

Conversely, it will be appreciated by persons of ordinary skill in the art that the start time of the portion of the recorded program employed at block 320 is the normalized start time retrieved from the later created log entry data structure 58, 70 if the non-real time content identifier 94 is invoked from block 288 of FIG. 12C (i.e., a rewound portion is being identified). Similarly, the end time of the portion of the recorded program employed at block 324 is the normalized end time retrieved from the earlier created log entry data structure 58, 70 if the non-real time content identifier 94 is invoked from block 288 of FIG. 12C (i.e., a rewound portion is being identified).

As mentioned above, the recapture identifier 96 is invoked at block 300 of FIG. 12B. The operation of the recapture identifier 96 will now be explained in connection with FIG. 14. The recapture routine begins at block 350 when the recapture identifier 96 determines if there are any rewound segments identified in the recapture table (e.g., the recapture table of FIG. 6). If there are no rewound segments in the recapture table (block 350), the recapture routine immediately terminates and control returns to block 270 of FIG. 12A. If there are rewound segments in the recapture table (block 350), the recapture identifier 96 determines if there are any fast forwarded and/or skipped segments identified in the recapture table (block 352). If there are no fast forwarded and/or skipped segments in the recapture table (block 352), the recapture routine immediately terminates and control returns to block 270 of FIG. 12A. If there are fast forwarded and/or skipped segments in the recapture table (block 352), control advances to block 354.

At block 354, the recapture identifier 96 retrieves the first fast forwarded and/or skipped segment from the recapture table. The recapture identifier 96 then compares the retrieved fast forwarded and/or skipped segment to the segment(s) listed in the recapture table as rewound segments (block 356). If the retrieved fast forwarded and/or skipped segment appears on the rewound list of the recapture table (block 356), the retrieved segment is deleted from both the advanced list and the rewound list of the recapture table (block 358) and control advances to block 360. Otherwise, control advances directly from block 356 to block 360.

At block 360, the recapture identifier 96 determines if every segment in the advanced segment list of the recapture table has been compared to the segment(s) appearing in the rewound list of the recapture table. If not, control advances to block 362 where the next segment appearing in the advanced list of the recapture table is retrieved. Control then returns to block 356.

Control continues to loop through blocks 356-360 until every segment in the advanced list has been compared to the segment(s) in the rewound list (block 360). The recapture routine then terminates and control returns to block 270 of FIG. 12A.

Figure 15:
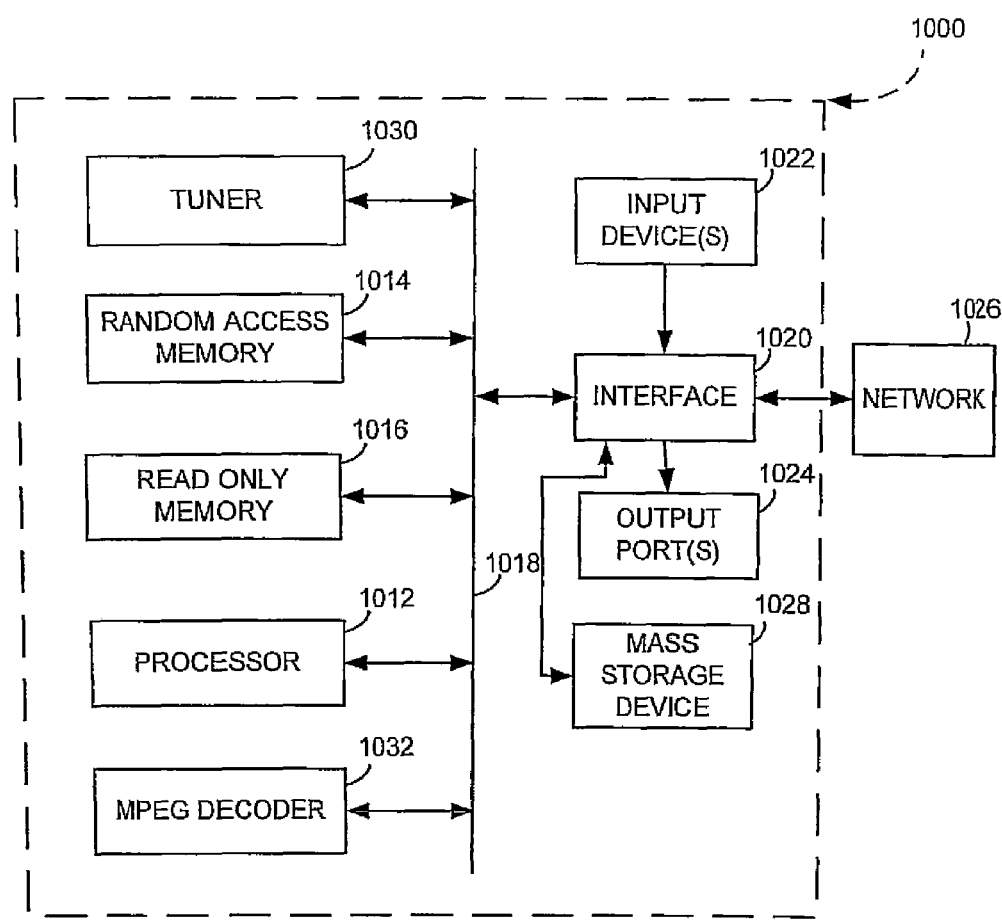
FIG. 15 is a schematic illustration of an example device that may be used to execute the instructions represented by the flowcharts of FIGS. 7-14 to implement the apparatus of FIG. 2.

FIG. 15 is a block diagram of an example device 1000 capable of implementing the apparatus and methods disclosed herein. In particular, the device 1000 can be, for example, a server, a personal computer, a personal digital assistant (PDA), an Internet appliance, a DVD player, a CD player, a digital video recorder, a personal video recorder, a set top box, device, an application specific device such as the data logging device 26, or any other type of computing device.

The system 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The device 1000 also includes a conventional interface circuit 1020. The interface circuit 1020 may be implemented by any type of well known interface standard, such as an Ethernet interface, a universal serial bus (USB), a high performance serial bus such as an IEEE 1394 bus or firewire, and/or a third generation input/output (3GIO) interface.

One or more input devices 1022 may be connected to the interface circuit 1020. The input device(s) 1022 permit a user to enter data and commands into the processor 1012. The input device(s) can be implemented by, for example, an infrared hand held controller, a keyboard, a mouse, a touchscreen, a track-pad, a trackball, isopoint and/or a voice recognition system.

One or more output ports 1024 are also connected to the interface circuit 1020. The output ports 1024 can be implemented, for example, by serial ports (e.g., DB-9, USB, etc) or parallel ports.

The interface circuit 1020 also includes a communication device (e.g., communication device 56) such as a modem or network interface card to facilitate exchange of data with external computers via a network 1026 (e.g., an Ethernet connection, a digital subscriber line (DSL), a telephone line, coaxial cable, a cellular telephone system, etc.).

The device 1000 also includes one or more mass storage devices 1028 for storing software and data. Examples of such mass storage devices 1028 include flashcards, jump drives, floppy disk drives, hard drive disks, compact disk drives and digital versatile disk (DVD) drives.

The device 1000 may also include a tuner 1030 for receiving broadcast programs and/or an MPEG decoder 1032 for compressing, encoding, decompressing and/or decoding the received programs.

The device of FIG. 15 may be representative of the digital recording device 24 and/or the data logging device 26. The data logging device 26 may be similarly constructed to the digital recording device 24, but it would typically not include input device(s) 1022, a tuner 1030 or an MPEG decoder 1032.

Although the above examples focused on video broadcast programs intended for consumption on a visual information presenting device 22 (e.g., a television) coupled to a digital recording device 24 such as a digital video recorder, a personal video recorder and/or a set top box, persons of ordinary skill in the art will appreciate that the methods and apparatus described herein could also be used with broadcast programs intended for consumption on a purely audio information presenting device (e.g., a radio) and/or to analog recording devices (e.g., a cassette recorder and/or a VCR).

Further, although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to detect portions of a recorded program that were not played back in real time, comprising:
    a time stamper to record a plurality of recording times in association with a recorded program, respective ones of the recording times indicating times of day at which respective sections of the recorded program were recorded;
    a memory to store the recorded program;
    a presentation time retriever to:
        retrieve a first recording time of the recording times of a first section of the sections of the recorded program being played back;
        retrieve a second recording time of the recording times of a second section of the sections of the recorded program being played back;
        store the first recording time in association with a first playback time of the first section; and
        store the second recording time in association with a second playback time of the second section; and
    a detector to compare the first and second recording times to calculate a recording interval.

2. An apparatus as defined in claim 1 wherein the first playback time is to be provided by the time stamper.

3. An apparatus as defined in claim 1 wherein the recorded program is stored as a plurality of packets, and the time stamper is to record the recording times in headers of the packets.

4. An apparatus as defined in claim 1 further comprising a non-real time content identifier responsive to a detected difference between the recording interval and a playback interval to identify a portion of the recorded program that was not played back in real time.

5. An apparatus as defined in claim 4 wherein the non-real time content identifier is to identify the portion of the recorded program that was not played back in real time by:
    comparing a start time of the recording interval associated with the portion of the recorded program that was not played back in real time to known start times associated with segments of the recorded program;
    comparing an end time of the recording interval associated with the portion of the recorded program that was not played back in real time to known end times associated with segments of the recorded program; and
    if the start time of the recording interval associated with the portion of the recorded program that was not played back in real time substantially matches the known start time of a first segment, and the end time of the recording interval associated with the portion of the recorded program that was not played back in real time substantially matches the known end time of the first segment, identifying the first segment as the portion of the recorded program that was not played back in real time.

6. An apparatus as defined in claim 5 wherein if the start time of the recording interval associated with the portion of the recorded program that was not played back in real time substantially matches the known start time of the first segment, and the end time of the recording interval associated with the portion of the recorded program that was not played back in real time substantially matches the known end time of a second segment, the non-real time content identifier is to identify the first segment, the second segment and any segments between the first and second segments as the portion of the recorded program that was not played back in real time.

7. An apparatus as defined in claim 5 wherein the start times and the end times of the recording interval associated with the portion of the recorded program that was not played back in real time are normalized to a broadcast duration of the recorded program.

8. An apparatus as defined in claim 4 wherein the non-real time content identifier is to identify the portion of the recorded program that was not played back in real time by:
  comparing the recording interval associated with the portion of the recorded program that was not played back in real time to known intervals associated with segments of the recorded program; and
  if the recording interval associated with the portion of the recorded program that was not played back in real time overlaps with at least a predetermined amount of at least one of the known intervals, identifying at least one segment associated with the at least one of the known intervals as the portion that was not played back in real time.

9. An apparatus as defined in claim 8 wherein the recording interval associated with the portion of the recorded program that was not played back in real time is normalized to a broadcast duration of the recorded program.

10. An apparatus as defined in claim 4 further comprising a recapture identifier to determine if a portion of the recorded program that was passed at a rate greater than real time was viewed in real time as a result of rewinding the recorded program.

11. An apparatus as defined in claim 10 wherein at least one of the time stamper, the memory, the detector or the presentation time retriever are located at a monitored home, and wherein at least one of the detector, the non-real time content identifier, or the recapture identifier are located at least one of a collection facility or a data logging device.

12. An apparatus as defined in claim 1 wherein the recorded program is stored in the memory as a plurality of data packets, and the recording times are stored in headers of the data packets.

13. An apparatus as defined in claim 12 wherein each of the recording times is stored in association with at least one respective packet.

14. An apparatus as defined in claim 1 wherein the first playback time is stored in a log entry data structure to be used to detect portions of the recorded program that were not played back in real time.

15. An apparatus as defined in claim 14 wherein the presentation time retriever is to store the first recording time in the log entry data structure in association with the first playback time.

16. An apparatus as defined in claim 1 wherein the presentation time retriever is to store the first recording time in association with the first playback time by storing the first recording time in a log entry data structure representative of the first playback time.

17. An apparatus as defined in claim 1 further comprising a difference detector to detect a difference between a playback interval and the recording interval, wherein the difference detector is to, in response to detecting the difference, indicate that a portion of the recorded program corresponding to the recording interval was not played back in real time.

18. An apparatus as defined in claim 1 wherein the recorded program is recorded on a local recording device from a broadcast signal.

19. An apparatus as defined in claim 18 wherein the local recording device comprises at least one of a digital video recorder, a set top box, a personal video recorder, or an analog video recorder.

20. An apparatus as defined in claim 1 wherein the presentation time retriever is to store at least one of a channel identifier, a broadcast station identifier, an input source code, a program identifier, a name of the recorded program, a universal network identifier, a universal program identifier, a digital recording device serial number, a tuner identification number, or a playback mode code in association with the first playback time.

21. An apparatus as defined in claim 1 wherein:
  if the recording interval is zero then playback is determined to be paused for a duration of a corresponding playback interval,
  if the recording interval has a first sign then a corresponding portion of the recorded program is determined to be played at a rate different than real time, and
  if the recording interval has a second sign opposite the first sign then a rewind event is determined to have occurred.

22. A method of developing usage data with respect to a recorded program, comprising:
  storing recording times in association with sections of the recorded program, wherein the recording times represent times of day at which respective ones of the sections were recorded;
  playing back first and second ones of the sections;
  storing a first one of the recording times corresponding to the first section in association with a first playback time of the first recorded section;
  storing a second one of the recording times corresponding to the second section in association with a second playback time of the second recorded section; and
  comparing, via a logic circuit, the first and second recording times to generate a recording interval.

23. A method for generating a playback information log file entry, comprising:
  storing, via a logic circuit, a first timestamp in a log file indicative of when a stored program is played back, the first timestamp indicating a time of day;
  storing, via the logic circuit, a first recording time of the stored broadcast in the log file, the first recording time identifying a time of day at which a first segment of the stored program was recorded; and
  in response to detecting a difference between (1) a recording interval based on the first recording time and a second recording time and (2) a playback interval based on the first timestamp and a second timestamp, obtaining and storing, via the logic circuit, a program identifier in the log file corresponding to at least one of a start time of the recording interval or an end time of the recording interval.

24. A method as defined in claim 23 wherein the log file stores at least one of a broadcast channel number, an input source code for the stored program, a station name for a station that broadcast the stored program, a program name for the stored program, a universal station identifier for the station that broadcast the stored program, a universal network identifier, a universal program identifier, a digital recording device serial number, a tuner identification number, or a playback mode code for the stored program.

25. A tangible machine readable storage device comprising instructions that, when executed, cause a machine to at least:

store recording times in association with sections of a recorded program, wherein the recording times represent times of day at which respective ones of the sections were recorded;

store a first one of the recording times corresponding to the first section in association with a first playback time of the first recorded section;

store a second one of the recording times corresponding to the second section in association with a second playback time of the second recorded section; and generate a recording interval by comparing the first and second recording times.

* * * * *